US012683879B2

(12) United States Patent
Basnight et al.

(10) Patent No.:  US 12,683,879 B2
(45) Date of Patent:        Jul. 14, 2026

(54) DEADLOCK DETECTION AND REMOVAL FOR MESH NETWORK FOR A PROCESSOR-BASED SYSTEM

(71) Applicant: Microsoft Technology Licensing, LLC, Redmond, WA (US)

(72) Inventors: Thomas Basnight, Raleigh, NC (US); Gregory A. Bryant, Raleigh, NC (US); Viren Ramesh Patel, Cary, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 18/375,799

(22) Filed: Oct. 2, 2023

(65) Prior Publication Data

US 2025/0112845 A1      Apr. 3, 2025

(51) Int. Cl.
H04L 43/0811      (2022.01)
H04L 49/00      (2022.01)
H04L 49/109      (2022.01)

(52) U.S. Cl.
CPC ........ H04L 43/0811 (2013.01); H04L 49/109 (2013.01); H04L 49/3063 (2013.01)

(58) Field of Classification Search
CPC ............... H04L 43/0811; H04L 49/109; H04L 49/3063; G06F 15/7825; G06F 9/524
See application file for complete search history.

(56) References Cited

U.S. PATENT DOCUMENTS 6,085,276 A * 7/2000 VanDoren ............. G06F 13/362
                                                              709/200

6,173,308 B1 * 1/2001 Hilditch ................. G06F 9/524
                                                              718/104
6,285,679 B1 * 9/2001 Dally ...................... H04L 49/30
                                                              370/413
6,370,145 B1 * 4/2002 Dally .................... H04L 49/251
                                                              370/409
7,379,424 B1 * 5/2008 Krueger ................. H04L 45/02
                                                              709/239

(Continued)

FOREIGN PATENT DOCUMENTS

JP        2013534113 A   *   8/2013   ............. H04L 49/90

OTHER PUBLICATIONS

International Search Report and Written Opinion received for PCT Application No. PCT/US2024/047909, Jan. 3, 2025, 15 pages.

(Continued)

*Primary Examiner* — Wutchung Chu
(74) *Attorney, Agent, or Firm* — Scott Y. Shigeta; Newport IP, LLC

(57)      ABSTRACT

Systems and methods are disclosed for detecting a deadlock in a cyclical dependency between a set of the plurality of nodes in a mesh network. In some aspects, each of the nodes having a stall detection circuit. The stall detection circuit of each of the nodes operates by providing a stall output that is asserted not only when linked input and output pipeline circuits are stalled but when a stall input from an upstream node indicates that the upstream node is stalled. The stall output is provided as a stall input to the downstream node. In this manner, the stall outputs of the stall detection circuits are stable and asserted when there is a deadlock in a cyclical dependency between a closed loop of nodes in the mesh network.

20 Claims, 8 Drawing Sheets

(56)          References Cited

U.S. PATENT DOCUMENTS

| | | | | | |
|---|---|---|---|---|---|
| 7,461,236 | B1 * | 12/2008 | Wentzlaff | ........... | G06F 13/1673 |
| | | | | | 712/18 |
| 7,668,979 | B1 * | 2/2010 | Wentzlaff | ........... | G06F 13/4022 |
| | | | | | 710/33 |
| 8,045,546 | B1 * | 10/2011 | Bao | .................... | G06F 13/4265 |
| | | | | | 370/386 |
| 9,009,648 | B2 * | 4/2015 | Kumar | .................... | H04L 47/12 |
| | | | | | 716/138 |
| 9,058,129 | B2 * | 6/2015 | Sengupta | .................. | G06F 8/10 |
| 9,244,880 | B2 * | 1/2016 | Philip | ............... | G06F 15/17312 |
| 9,633,153 | B1 * | 4/2017 | Khaikin | .................. | G06F 30/33 |
| 9,781,043 | B2 * | 10/2017 | Kumar | .................... | H04L 47/16 |
| 10,565,346 | B1 * | 2/2020 | Suthar | .................. | G06F 30/392 |
| 12,021,738 | B2 * | 6/2024 | Froese | ............... | G06F 13/1642 |
| 2007/0101338 | A1 * | 5/2007 | Heddaya | .............. | G06F 11/366 |
| | | | | | 718/104 |
| 2008/0107105 | A1 * | 5/2008 | Reilly | .................... | H04L 49/90 |
| | | | | | 370/389 |
| 2008/0109586 | A1 * | 5/2008 | Godiwala | .......... | G06F 13/1652 |
| | | | | | 710/305 |
| 2012/0131309 | A1 * | 5/2012 | Johnson | .................. | G06F 9/323 |
| | | | | | 712/E9.004 |
| 2014/0068132 | A1 * | 3/2014 | Philip | .............. | G06F 15/17312 |
| | | | | | 710/306 |
| 2014/0204735 | A1 * | 7/2014 | Kumar | .................... | H04L 47/12 |
| | | | | | 370/229 |
| 2015/0016257 | A1 * | 1/2015 | Kumar | .................... | H04L 47/16 |
| | | | | | 370/235 |
| 2015/0117261 | A1 * | 4/2015 | Kumar | .................... | G06F 30/39 |
| | | | | | 370/255 |
| 2015/0188848 | A1 * | 7/2015 | Tran | ........................ | H04L 12/18 |
| | | | | | 370/417 |
| 2017/0168876 | A1 * | 6/2017 | Tummala | ................ | G06F 9/524 |
| 2018/0276052 | A1 * | 9/2018 | Kim | ........................ | G06F 9/524 |
| 2019/0007300 | A1 * | 1/2019 | Karanam | ............ | H04L 47/6235 |
| 2021/0406214 | A1 * | 12/2021 | Petrini | .............. | G06F 15/17306 |
| 2022/0224639 | A1 * | 7/2022 | Froese | ............... | G06F 13/1642 |
| 2023/0087502 | A1 * | 3/2023 | Gupta | ....................... | G06F 1/12 |
| | | | | | 713/322 |
| 2023/0096061 | A1 * | 3/2023 | de Lescure | .......... | G06F 30/337 |
| | | | | | 370/230 |
| 2024/0129260 | A1 * | 4/2024 | Farrokhbakht | ......... | H04L 45/22 |
| 2024/0195742 | A1 * | 6/2024 | Enrici | .................... | H04L 45/18 |
| 2024/0244013 | A1 * | 7/2024 | Li | ......................... | H04L 49/109 |
| 2024/0296132 | A1 * | 9/2024 | Eyole | ................... | G06F 13/1652 |
| 2024/0427978 | A1 * | 12/2024 | Charif | .................. | G06F 30/392 |
| 2025/0112845 | A1 * | 4/2025 | Basnight | ............ | H04L 49/3063 |

OTHER PUBLICATIONS

Zhang, et al., "Handling Physical-Layer Deadlock Caused by Permanent Faults in Quasi-Delay-Insensitive Networks-on-Chip", IEEE transactions on very large scale integration (VLSI) systems, vol. 25, No. 11, Aug. 15, 2017, pp. 3152-3165.

International Preliminary Report on Patentability (Chapter I) Received for PCT Application No. PCT/US2024/047909, Mailed on Apr. 9, 2026, 11 Pages.

* cited by examiner

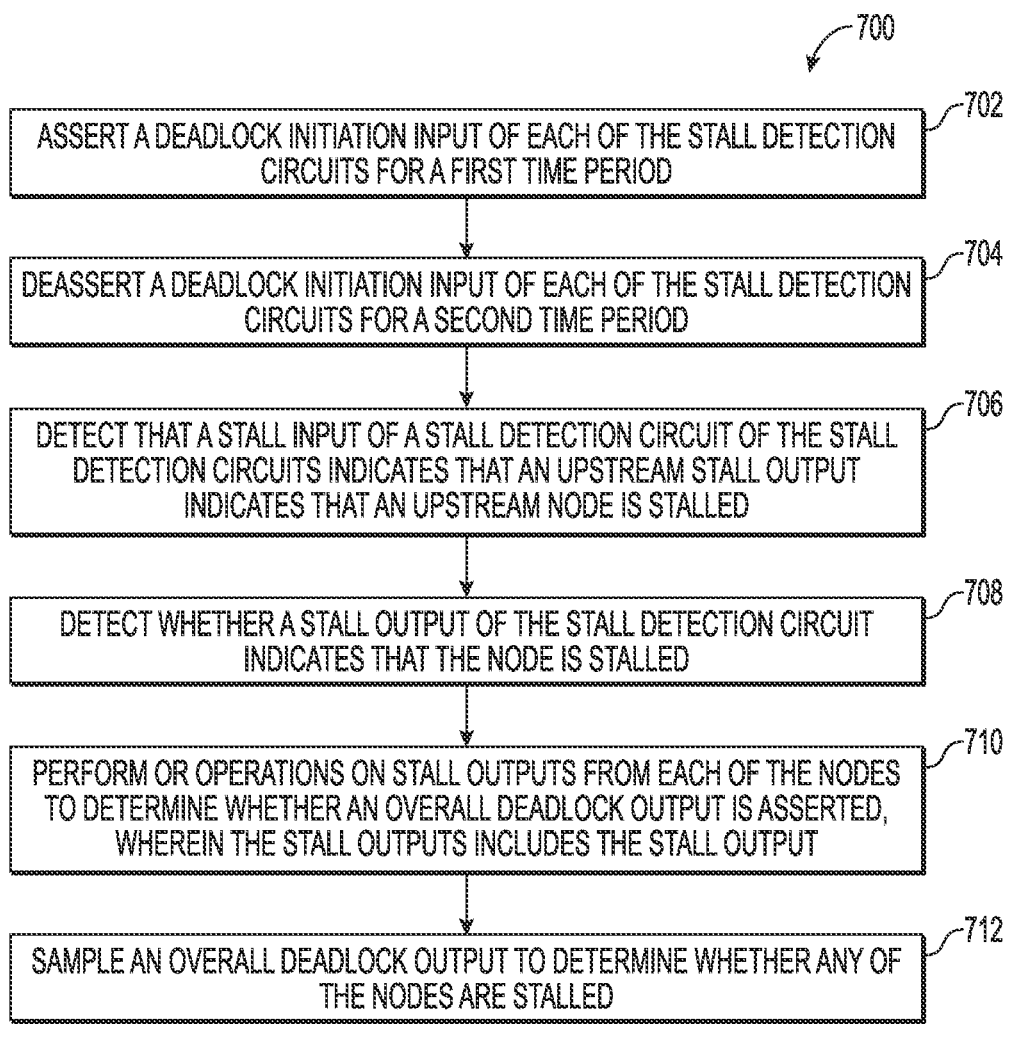

700

ASSERT A DEADLOCK INITIATION INPUT OF EACH OF THE STALL DETECTION CIRCUITS FOR A FIRST TIME PERIOD ⟍702

DEASSERT A DEADLOCK INITIATION INPUT OF EACH OF THE STALL DETECTION CIRCUITS FOR A SECOND TIME PERIOD ⟍704

DETECT THAT A STALL INPUT OF A STALL DETECTION CIRCUIT OF THE STALL DETECTION CIRCUITS INDICATES THAT AN UPSTREAM STALL OUTPUT INDICATES THAT AN UPSTREAM NODE IS STALLED ⟍706

DETECT WHETHER A STALL OUTPUT OF THE STALL DETECTION CIRCUIT INDICATES THAT THE NODE IS STALLED ⟍708

PERFORM OR OPERATIONS ON STALL OUTPUTS FROM EACH OF THE NODES TO DETERMINE WHETHER AN OVERALL DEADLOCK OUTPUT IS ASSERTED, WHEREIN THE STALL OUTPUTS INCLUDES THE STALL OUTPUT ⟍710

SAMPLE AN OVERALL DEADLOCK OUTPUT TO DETERMINE WHETHER ANY OF THE NODES ARE STALLED ⟍712

FIG. 7

DEADLOCK DETECTION AND REMOVAL FOR MESH NETWORK FOR A PROCESSOR-BASED SYSTEM

FIELD OF THE DISCLOSURE

This disclosure relates generally to system and methods of detecting deadlocks in a mesh network.

BACKGROUND

Cores in a system on chip (SoC) often communicates through a mesh network of routers. The routers receive input data and output data from the cores (or other peripheral circuitry) and then transfer the data to other cores or periph- eral circuitry in the mesh network. These mesh networks need to transmit data in an efficient fashion in order for the SoC to operate efficiently.

Transport deadlocks occur when a cyclic dependency is created in an interconnect network. This problem is complex in a mesh network because many possible loops can be created between nodes and monitoring all of them at once is a significant challenge. Also, because a deadlock is a cata- strophic failure, it is highly desirable to avoid any false- positive detection of deadlock. Therefore, accurate detection of a deadlock is a challenge since false-positives can waste significant resources in the mesh network.

SUMMARY

Aspects disclosed herein include deadlock detection and removal for a mesh interconnect network for a processor- based system. The deadlock detection includes detection of a deadlock in a cyclical dependency between a set of the plurality of nodes in a mesh network. A node is a routing circuit configured to route data within the mesh network. The inputs of each node are coupled to respective output of upstream nodes as part of the node establishing a routing path in the network. The output of each node is coupled to inputs of multiple downstream nodes as part of the node in the network. Each node in the mesh interconnect network ("mesh network") includes multiple input and output pipe- lines that are configured to be coupled to its inputs and outputs to provide different routing paths through the node. However, cyclical deadlocks can form in nodes in the mesh network depending on input and output pipelines of nodes are routed to other nodes. It is desired to be able to detect and unlock such cyclical deadlocks. In this regard, in some aspects, each of the nodes in the mesh network includes a stall detection circuit. The stall detection circuit of each of the nodes is configured to detect that the node is part of a cyclical deadlock in the mesh interconnect network. The stall detection network is configured to detect that its node is part of a cyclical deadlock by being configured to generate a stall output that is asserted not only when linked input and output pipeline circuits are deadlocked, but also when an upstream node coupled to the input pipeline circuit is deadlocked. The stall output is provided as a stall input to the downstream node in the mesh network. In this manner, the stall outputs of the stall detection circuits are stable and asserted when there is a deadlock in a cyclical dependency between a closed loop of nodes in the mesh network. In this manner, a single node in the mesh interconnect network can detect a cyclical deadlock by its input and output are stalled.

In some embodiments, a mesh network, includes: a plu- rality of nodes configured to form the mesh network, each node includes: a plurality of input pipeline circuits; a plurality of output storage pipeline circuits; and a plurality of arbiter circuits each configured to arbitrate data traffic between an input pipeline circuit of the plurality of input pipeline circuits and an output pipeline circuit of the plu- rality of output pipeline circuits; and a stall detection circuit, includes: a stall input coupled to an upstream stall output of an upstream node in the plurality of nodes; and a stall output coupled to a downstream stall input of a downstream node in the plurality of nodes; wherein the stall detection circuit is configured to detect a deadlock in a cyclical dependency between a set of the plurality of nodes that includes the node, in response to: the stall input indicating that the upstream stall output indicates that the upstream node is stalled; and the stall output indicating that the node is stalled. In some embodiments, the stall detection circuit is configured to provide the stall output such that the stall output indicates that the node is stalled, in response to: one of the plurality of input pipeline circuits is stalled, wherein the one of the plurality of input pipeline circuits that is stalled corresponds with the stall input; one of the plurality of output pipeline circuits is stalled; and one of the arbiter circuits links the one of the plurality of input pipeline circuits that is stalled to the one of the output pipeline circuits that is stalled. In some embodiments, the stall output corresponds to the one of the output pipeline circuits that is stalled. In some embodiments, the stall input is a first stall input; the upstream stall output is a first upstream stall output; the stall output is a first stall output; the downstream stall input is a first downstream stall input; and the stall detection circuit further includes: a plurality of stall inputs that include the first stall input, each of the stall inputs is coupled to a different one a plurality of upstream stall outputs of the upstream node, the plurality of upstream stall outputs including the first upstream stall output, each of the input pipeline circuits corresponding to a different one of the stall inputs; and a plurality of stall outputs that include the first stall output, each of the stall outputs is coupled to a different one of a plurality of downstream stall inputs of the downstream node, the plu- rality of downstream stall inputs including the first down- stream stall input, each of the output pipeline circuits corresponding to a different one of the stall output. In some embodiments, the stall detection circuit is configured to detect the deadlock in the cyclical dependency between the set of the plurality of nodes that includes the node, in response to: any one of the stall outputs indicating that the node is stalled; and any one of the arbiter circuits having linked any one of the stall inputs that indicates that the corresponding upstream stall output is stalled to at least one of the stall outputs that indicates that the node is stalled. In some embodiments, the stall detection circuit is configured to provide any one of the stall outputs so as to indicate that the node is stalled, in response to: one of the plurality of input pipeline circuits being stalled, wherein the one of the plurality of input pipeline circuits that is stalled corresponds with one of the stall inputs that indicates that the upstream node is stalled; one of the plurality of output pipeline circuits is stalled; and any one of the arbiter circuits linking the one of the plurality of input pipeline circuits that is stalled to the one of the output pipeline circuits that is stalled. In some embodiments, each of the stall outputs corresponds to a different one of the output pipeline circuits. In some embodi- ments, the stall detection circuit at further includes: an input pipeline input configured to indicate whether an input pipe- line circuit of the plurality of input pipeline circuit is stalled; an output pipeline input configured to indicate whether an output pipeline circuit of the plurality of output pipeline circuits is stalled; and wherein the stall detection circuit of each of the nodes is configured to generate the stall output such that the stall output indicates that the node is stalled in response to: at least one of the arbiter circuits having linked the input pipeline circuit to the output pipeline circuit; the input pipeline input indicating that the input pipeline circuit is stalled, wherein the stall input corresponds to the input pipeline circuit; and the output pipeline circuit indicating that the output pipeline circuit is stalled, wherein the stall output corresponds to the output pipeline circuit. In some embodiments, the stall detection circuit includes an input AND gate and an output AND gate, wherein: the input AND gate having a first AND input coupled to the stall input and a second AND input coupled to the input pipeline input, the input AND gate first AND output as an intermediary stall input; and the output AND gate having a third AND input operably associated with the intermediary stall input by the at least one of the arbiter circuits and a fourth stall input coupled to the output pipeline input, wherein the output AND gate has the stall output. n some embodiments, the stall detection circuit further includes an output pipe OR gate, wherein: the output pipe OR gate has a first OR input operably associated with the intermediary stall input and a second OR input coupled to a deadlock initiation input, the output pipe OR gate having an output pipe OR output; and the third AND input is coupled to the output pipe OR output. In some embodiments, the mesh network further includes a controller configured to assert the deadlock initiation input so as to initiate a deadlock detection test. In some embodiments, the stall input is a first stall input; the upstream stall output is a first upstream stall output; the stall output is a first stall output; the downstream stall input is a first downstream stall input; the stall detection circuit of each of the nodes further includes: a plurality of stall inputs that include the first stall input, each of the stall inputs is coupled to a different one a plurality of upstream stall outputs of the upstream node, the plurality of upstream stall outputs including the first upstream stall output, each of the input pipeline circuits corresponding to a different one of the stall inputs; and a plurality of stall outputs that include the first stall output, each of the stall outputs is coupled to a different one of a plurality of downstream stall inputs of the downstream node, the plurality of downstream stall inputs including the first downstream stall input, each of the output pipeline circuits corresponding to a different one of the stall output; a plurality of input AND gates, each of the input AND gates corresponding to a different one of the input pipeline circuits, wherein each of the input AND gates has a first AND input coupled to a different one of the stall inputs and a second AND input coupled to a different one of the input pipeline inputs, wherein each of the input AND gate has an intermediary stall input; a plurality of output pipe OR gates, each output pipe OR gate of the output pipe OR gates corresponding to a different one of the output pipeline circuits, wherein each of the output pipe OR gates has a first OR input that is operably associated with the intermediary stall input of one of the input AND gates that corresponds to one of the input pipeline circuits that has been linked to the output pipe OR gate, a second OR input coupled to a deadlock initiation input, and an output pipe OR output; and a plurality of output AND gate, each output AND gate of the output AND gates corresponding to a different one of the output pipeline circuits, each of the output AND gates having a third AND input coupled to the output pipe OR output that has linked the one of the input pipeline circuit to the corresponding output pipeline circuit of the output AND gate and a fourth stall input coupled to the output pipeline input of the corresponding output pipeline circuit, wherein the output AND gate has a different one of stall outputs. In some embodiments, the stall detection circuit of each of the nodes further includes a deadlock OR gate, the deadlock OR gate includes a plurality of deadlock OR inputs and a deadlock OR output, each of the deadlock OR inputs being coupled to a different one of the stall outputs. In some embodiments, the mesh network further includes a controller coupled to the deadlock initiation input. In some embodiments, the mesh network further includes a network of OR gates configured to perform OR operation on the deadlock OR output from the stall detection circuit of each of the nodes and provide an overall deadlock output, wherein the controller is further coupled to the overall deadlock output. In some embodiments, the controller is configured to: assert the deadlock initiation input for a first time period; deassert the deadlock initiation input for a second time period; and sample the overall deadlock output to determine whether any of the nodes are stalled after the deadlock initiation input has been deasserted for the second time period. In some embodiments, the controller is further configured to declare that a deadlock has been detected in response to the overall deadlock output being asserted. In some embodiments, the mesh network further includes a plurality of cores, each of the cores being operably associated with a different one of the nodes and wherein each of the nodes is a router for the corresponding core. In some embodiments, the mesh network is provided in a system on chip (SoC).

In some embodiments, a method of detecting a deadlock in a cyclical dependency between a set of the plurality of nodes in a mesh network, each of the nodes having a stall detection circuit, the method includes: asserting a deadlock initiation input of each of the stall detection circuits for a first time period; deasserting the deadlock initiation input of each of the stall detection circuits for a second time period; detecting that a stall input of a stall detection circuit of the stall detection circuits indicates that an upstream stall output indicates that an upstream node is stalled; detecting whether a stall output of the stall detection circuit indicates that the node is stalled; performing OR operations on stall outputs from each of the nodes to determine whether an overall deadlock output is asserted, wherein the stall outputs includes the stall output; and sampling an overall deadlock output to determine whether any of the nodes are stalled.

In some embodiments, a mesh network, includes: a plurality of nodes configured to form the mesh network, each node includes: a plurality of input pipeline circuits; a plurality of output storage pipeline circuits; a plurality of arbiter circuits each configured to arbitrate data traffic between an input pipeline circuit of the plurality of input pipeline circuits and an output pipeline circuit of the plurality of output pipeline circuits; a stall detection circuit, includes: a stall input coupled to an upstream stall output of an upstream node in the plurality of nodes, the stall input corresponding to one of the input pipeline circuits; and a stall output coupled to a downstream stall input of a downstream node in the plurality of nodes, the stall output corresponding to one of the output pipeline circuits; and wherein the stall detection circuit is configured to detect a deadlock in a cyclical dependency between a set of the plurality of nodes that includes the node, in response to: the stall input indicating that the upstream node is stalled; one of the arbiter circuits linking the one of the input pipeline circuits to the one of the output pipeline circuits; and the stall output indicating that the node is stalled.

Those skilled in the art will appreciate the scope of the present disclosure and realize additional aspects thereof after reading the following detailed description of the preferred aspects in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 8:
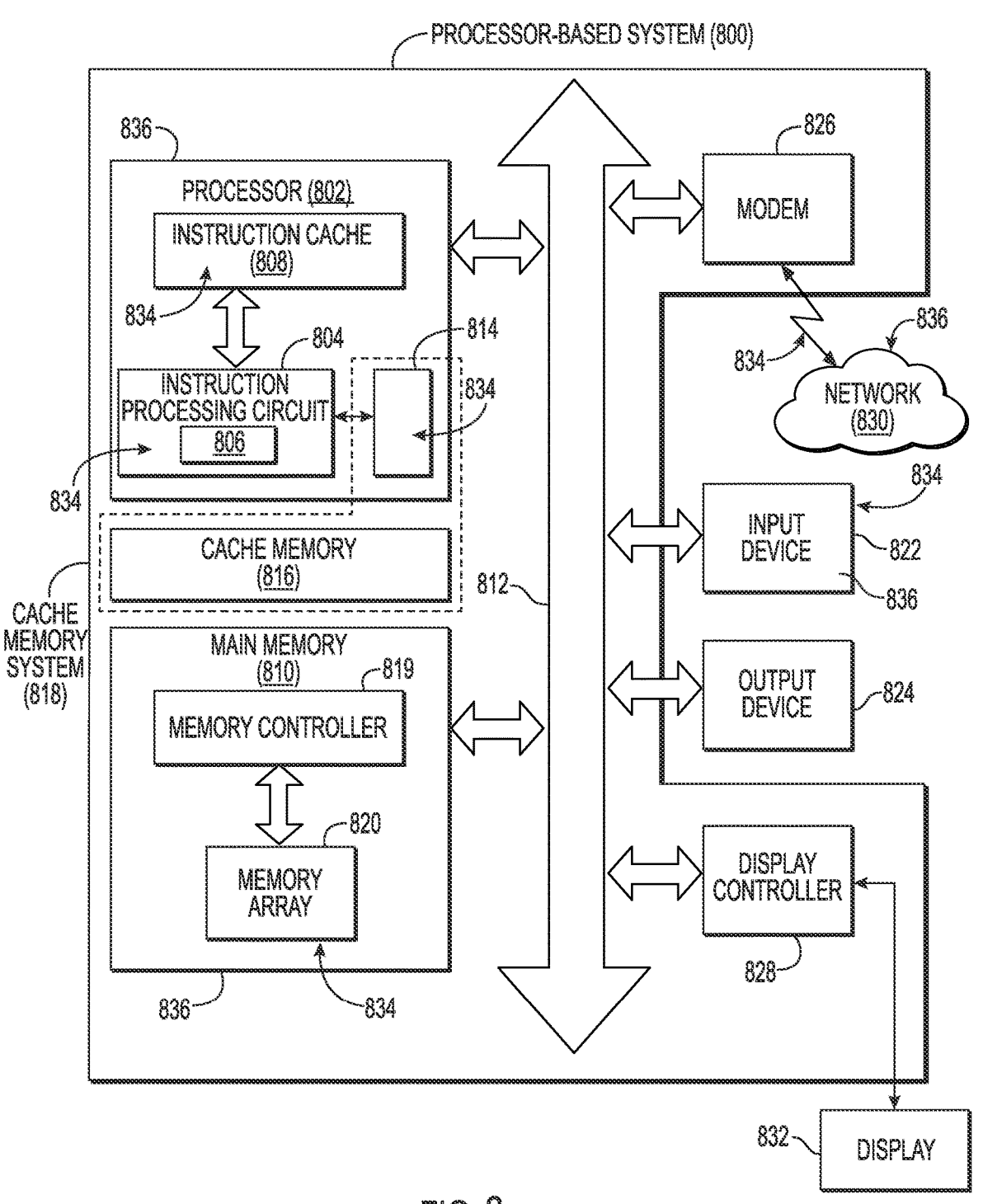

FIG. 7 is a flow diagram illustrating a method of detecting a deadlock in a cyclical dependency between a set of the plurality of nodes in a mesh network, wherein each of the nodes having a stall detection circuit, in accordance with some aspects; and FIG. 8 is a block diagram of an exemplary processor-based system that may include any of the mesh networks described above, in accordance with some aspects.

DETAILED DESCRIPTION

Aspects disclosed herein include deadlock detection and removal for a mesh network for a processor-based system. The deadlock detection includes detection of a deadlock in a cyclical dependency between a set of the plurality of nodes in a mesh network. A node is a routing circuit configured to route data within the mesh network. The inputs of each node are coupled to respective output of upstream nodes as part of the node establishing a routing path in the network. The output of each node is coupled to inputs of multiple downstream nodes as part of the node in the network. Each node in the mesh interconnect network ("mesh network") includes multiple input and output pipelines that are configured to be coupled to its inputs and outputs to provide different routing paths through the node. However, cyclical deadlocks can form in nodes in the mesh network depending on input and output pipelines of nodes are routed to other nodes. It is desired to be able to detect and unlock such cyclical deadlocks. In this regard, in some aspects, each of the nodes in the mesh network includes a stall detection circuit. The stall detection circuit of each of the nodes is configured to detect that the node is part of a cyclical deadlock in the mesh network. The stall detection circuit is configured to detect that its node is part of a cyclical deadlock by being configured to generate a stall output that is asserted not only when linked input and output pipeline circuits are deadlocked, but also when an upstream node coupled to the input pipeline circuit is deadlocked. The stall output is provided as a stall input to the downstream node in the mesh network. In this manner, the stall outputs of the stall detection circuits are stable and asserted when there is a deadlock in a cyclical dependency between a closed loop of nodes in the mesh network. In this manner, a single node in the mesh network can detect a cyclical deadlock by its input and output are stalled.

Figure 1:
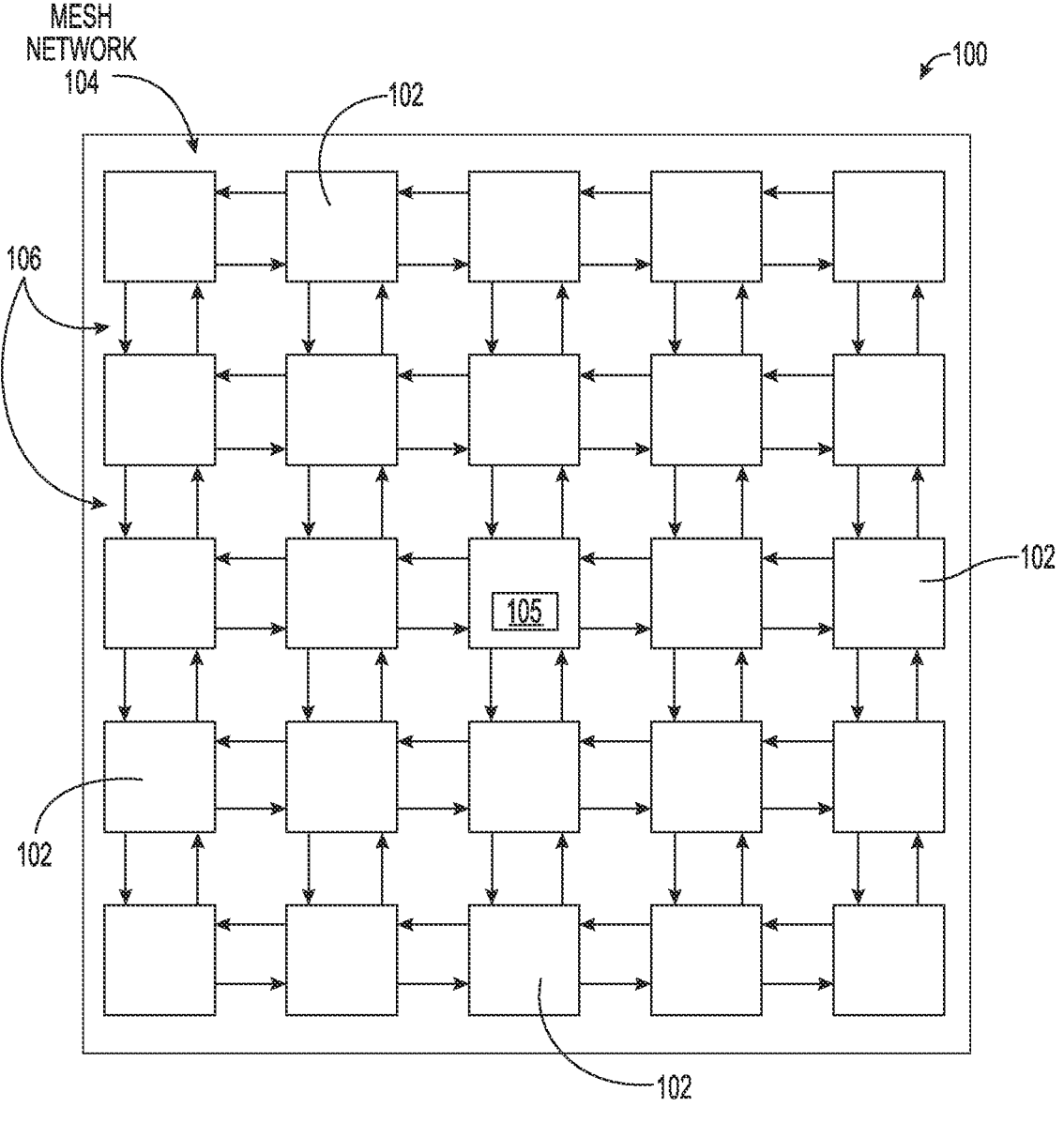
FIG. 1 is an integrated circuit (IC) chip with a mesh network of nodes, in accordance with some aspects.

In this regard, FIG. 1 is an integrated circuit (IC) chip 100, in accordance with some aspects. The IC chip 100, which may be a system-on-chip (SOC), may include many processing circuits (not shown here but for example cores) that are each coupled to one of a plurality of nodes 102(0)-102 (X) (referred to generically as node(s) 102) in a mesh network 104. The nodes 102 are coupled to each other by segments 106 of the mesh network 104. The nodes 102 are configured to transmit and receive data so that the data is routed to different nodes 102 in the mesh network 102. Data is then transmitted and received between the nodes 102 and system components (not shown here) on the IC chip 100. In some aspects, the nodes 102 are routers that are configured to route data between the different nodes 102 and thus allow for the routing between different system components that are coupled to the nodes. Data transfers are generally synchronized by a system clock (not explicitly shown) where the system clock is employed to clock sequential circuits in the IC chip 100.

In one example, different cores (not shown in FIG. 1) are coupled to each of the nodes 102. The different cores are configured to implement computer executable instructions to perform specified functions on input data and thereby generate output data. The output data from one core may then be transferred through the nodes 102 to become the input data for another core, which implements computer executable instructions for its input data. In order for a computer program to progress effectively, data should be transferred through the nodes 102. Unfortunately, data transfers between the nodes 102 are sometimes slowed down or even stopped resulting in data congestion in the interconnect fabric formed by the nodes 102. This congestion can sometimes prevent a transferring node 102 from transferring data to a receiving node 102 until data in the receiving node passes to another node. The interdependency between data transfers of the nodes 102 can sometimes prevent data transfers from moving forward and thereby result in data transfer failures.

For example, a deadlock occurs in the mesh network 104 when a group of nodes 102 form a cyclic dependency where none of the nodes 102 in the group may make forward progress. When nodes 102 have a cyclical dependency data transfer between the nodes 102 result in a closed loop in the group of nodes 102. In other words, if one were to select any node 102 in the group of nodes 102 as a starting node 102 for data transfers, eventually the data transfers between the different nodes 102 would lead back to the starting node 102. A deadlock occurs in the interconnected nodes any time that a group of nodes 102 form a cyclic dependency where none of the nodes 102 in the group can make forward progress. When the nodes 102 have a cyclic dependency, the data transfers of one node 102 depend on the data transfers of the next node 102. If the data transfers of one of the nodes 102 are prevented from making forward progress, then the forward progress of the next node 102 is also prevented from making forward progress. Since data transfers between the nodes 102 having a cyclic dependency always loop back to the same node 102, all of the nodes 102 in the group are thus prevented from making forward progress. If this is the case, the deadlock should ideally be detected so that the cores and nodes 102 can be appropriately reset. In order to detect a deadlock in a cyclical dependency, each of the nodes includes a stall detection circuit 105. Note that (only one of the nodes 102 is shown with the stall detection circuit 105, but it should be noted that in this example each of the nodes 102 includes the stall detection circuit 105. As discussed in more detail below starting at FIG. 3, the stall detection circuit 105 in each of the nodes 102 is configured to detect that the node 102 is part of a cyclical deadlock in the mesh network 104.

Figure 2:
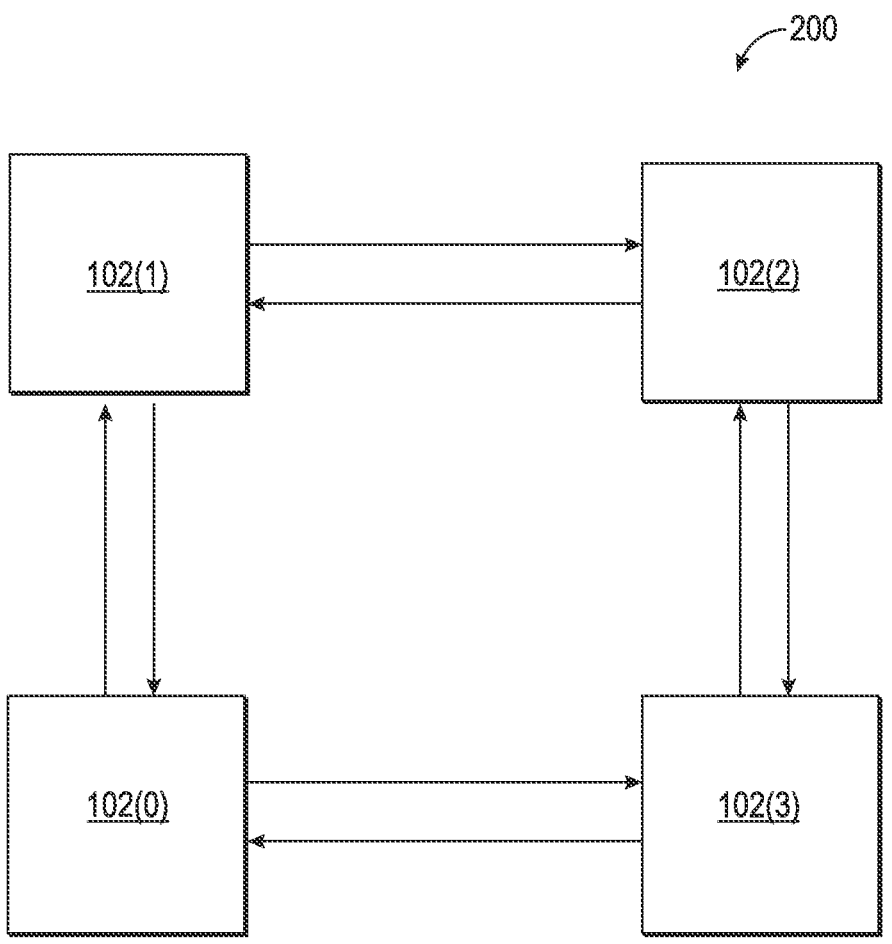
FIG. 2 is a system component having a group of nodes, where the nodes form a closed loop having a cyclical dependency, in accordance with some aspects.

FIG. 2 is a system component 200 having a group of nodes (referred to specifically as nodes 102(0)-102(3) and generically as nodes 102) in the mesh network 104 in FIG. 1, where the nodes 102 have a cyclical dependency, in accordance with some aspects.

In this example, there are four nodes 102(0)-102(3) that are shown as having a cyclic dependency. However, in other aspects, any number of the nodes 102 greater than two can have a cyclic dependency.

As shown in FIG. 2, the node 102(0) transfers output data to the node 102(1). The output data of node 102(0) is the input data of node 102(1). The system component operably associated with node 102(1) is configured to process the input data and generate output data. The node 102(1) is configured to transfer the output data to node 102(2) as input data. The system component operably associated with node 102(2) is configured to process the input data and generate output data. The node 102(2) is configured to transfer the output data to node 102(3) as input data. The system component operably associated with node 102(3) is configured to process the input data and generate output data. The node 102(3) is configured to transfer the output data to node 102(0) as input data. The system component operably associated with node 102(0) is configured to process the input data and generate output data. The node 102(0) is configured to transfer the output data to node 102(1) as input data. Accordingly, as shown, the nodes 102 have a cyclical dependency in the clockwise direction because the nodes 102 transfer data to one another in a closed loop in the clockwise direction.

In some aspects, each node 102 has multiple input pipeline circuits and multiple output pipeline circuits. Data transfers between the input pipeline circuits and output pipeline circuits within each node 102 are arbitrated by arbitrator circuits (as explained in more detail below). As such, the node 102(0) transfers output data to the node 102(3). The output data of node 102(0) is the input data of node 102(3). The system component operably associated with node 102(3) is configured to process the input data and generate output data. The node 102(3) is configured to transfer the output data to node 102(2) as input data. The system component operably associated with node 102(2) is configured to process the input data and generate output data. The node 102(2) is configured to transfer the output data to node 102(1) as input data. The system component operably associated with node 102(1) is configured to process the input data and generate output data. The node 102(1) is configured to transfer the output data to node 102(0) as input data. The system component operably associated with node 102(0) is configured to process the input data and generate output data. The node 102(0) is configured to transfer the output data to node 102(3) as input data. Accordingly, as shown, the nodes 102 have a cyclical dependency in the counter-clockwise direction because the nodes 102 transfer data to one another in a closed loop in the counter-clockwise direction.

In this example, it is assumed that data transfers in the clockwise direction are independent of the data transfers in the counterclockwise direction. With regard to the clockwise direction, if any one of the nodes 102 cannot transfer data to the next node 102 in the clockwise direction, then the next node 102 in the sequence cannot transfer data to the next node 102 in the clockwise direction. This would continue all the way through the loop of nodes 102 in the clockwise direction. For example, if data is prevented from being transferred from the node 102(0) to the node 102(1), then the node 102(1) could not transfer new data into the node 102(2). This in turn would prevent node 102(2) from transferring new data into node 102(3). As such, node 102(3) cannot transfer new data into node 102(0). In this case, there is a deadlock in the group on nodes 102 in the clockwise direction because none of the nodes 102 in the group can make forward progress. Thus, while data transfers between the nodes 102 in the counterclockwise direction may be progressing, no forward progress can be made between the nodes in the clockwise direction and thus there is a deadlock between the nodes in the clockwise direction. The same is true with respect to the counter-clockwise direction in that there may be a deadlock between the nodes in the counter-clockwise direction while there is no deadlock in the clockwise direction. Forward progress in only one closed loop path between the nodes 102 need occur in order for there to be a deadlock. A deadlock is a catastrophic data event, which sometimes requires the resetting of entire systems in the SoC (e.g., SoC 100 in FIG. 1) or possibly dropping packets. Therefore, accurate detection of deadlocks is important as false positives can result in the inefficient operation of the SoC. Therefore, each of the nodes 102(0)-102(3) in FIG. 2 includes a stall detection circuit 105 (shown in FIG. 1).

Figure 3:
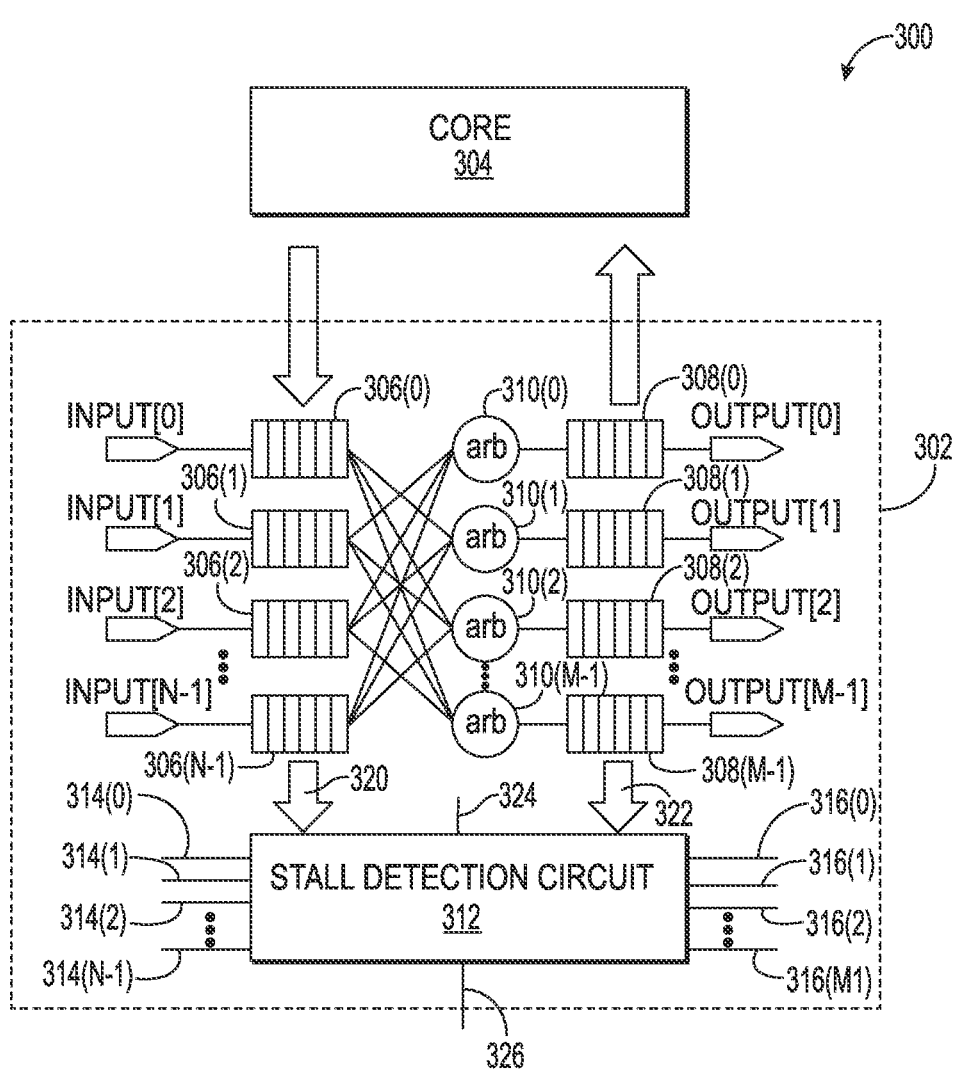
FIG. 3 is a system component that includes a node for a mesh interconnect network ("mesh network"), wherein the node includes a stall detection circuit that is configured to detect whether the node is involved in a cyclical deadlock, in accordance with some aspects.

In this regard, FIG. 3 is a system component 300 that includes a node 302 that includes a stall detection circuit 312 like the stall detection circuit 105 in FIG. 1. As discussed in more detail below starting at FIG. 3, the stall detection circuit 312 in each of the nodes 302 is configured to detect that the node 302 is part of a cyclical deadlock in a mesh network. The stall detection circuit 312 is configured to detect that its node 302 is part of a cyclical deadlock by being configured to generate a stall output that is asserted not only when linked input and output pipeline circuits are deadlocked, but also when an upstream node coupled to the input pipeline circuit is deadlocked. The stall output is provided as a stall input to the downstream node in the mesh network. In this manner, the stall outputs of the stall detection circuits 312 are stable and asserted when there is a deadlock in a cyclical dependency between a closed loop of nodes 302 in the mesh network 104. In this manner, a single node 302 in a mesh network can detect a cyclical deadlock by its input and output are stalled.

The node 302 may be any of the nodes 102 in FIG. 1 or any of the nodes 102 in FIG. 2. The node 302 can be provided in a mesh network like the mesh network 104 in FIG. 1. In some aspects, each of the nodes 102 in FIG. 1 are provided in the same manner as the node 302 in FIG. 3. In FIG. 3, the node 302 is operably associated with a core 304. The core 304 may include a finite state machine. The core 304 is configured to receive input data from the node 302. The core 304 processes the input data and generates output data. The core 304 then provides the output data to the node 302, which transmits the output data to another node in a mesh network (e.g., mesh network 104 in FIG. 1).

The node 302 includes input pipeline circuits (referred to specifically as input pipeline circuits 306(0)-306(N−1) and generically as input pipeline circuit(s) 306). In FIG. 3, there are N number of input pipeline circuits 306. The index between the parentheses ( ) starts at zero and therefore there the final value of the index for the input pipeline circuits 306 ends at N−1. In this aspect, N is equal or greater than 4. However, in other aspects, then number N of the input pipeline circuits 306 where N is greater or equal to 1.

Each of the input pipeline circuits 306 includes a set of registers. If n represents the index of the input pipeline circuits 306, the registers of the input pipeline circuit 306(n) are connected to an input terminal Input[n]. For example, if the index n=0, then the registers of the input pipeline circuit 306(0) are connected to an input terminal Input[0]. Input data is received at the input terminal Input[n] from the output pipeline circuit of an upstream node (or, in some cases, from a circuit in the SoC outside the mesh network). The input data is then stored in the registers of the input pipeline circuit 306(n). For example, input data is received at the input terminal Input[0] and stored in the registers of the input pipeline circuit 306(0). In some cases, the input data in the registers of the input pipeline circuits 306 is provided to the core 304, which processes the input data to generate output data. In other aspects, the input data is routed for transmission to a downstream node in the mesh network (e.g., mesh network 104 in FIG. 1).

The node 302 includes output pipeline circuits (referred to specifically as output pipeline circuits 308(0)-308(M−1) and generically as output pipeline circuit(s) 308). In FIG. 3, there are M numbers of output pipeline circuits 308. The index between the parentheses ( ) starts at zero and therefore there the final value of the index for the output pipeline circuits 308 ends at M−1. In this aspect, M is equal or greater than 4. However, in other aspects, the number M of the output pipeline circuits 308 where M is greater or equal to 1. In some aspects, M is equal to N. In other aspects, M is not equal to N.

Each of the output pipeline circuits 308 includes a set of registers. If m represents the index of the output pipeline circuits 308, the registers of the output pipeline circuit 308(m) are connected to an output terminal Output [m]. For example, if the index n=0, then the registers of the output pipeline circuit 308(0) are connected to an output terminal Output [0]. Output data from the registers in the output pipeline circuit 306(m) to the output terminal Output [m]. The output terminal Output [m] is coupled to the input pipeline circuit of a downstream node (or, in some cases, to a circuit in the SoC outside the mesh network). For example, output data stored in the registers of the output pipeline 306(0) is transmitted from the output terminal Output [0]. In some cases, the output data in the registers of the output pipeline circuits 308 is provided from the core 304. In other aspects, the output data is routed between the input pipeline circuits 306 and the output pipeline circuits 308 by arbiter circuits (referred to specifically as arbiter circuits 310(0)-310(M−1) and generically as arbiter circuits 310).

The node 302 includes the arbiter circuits 310 to arbitrate data traffic between an input pipeline circuit 306 of the plurality of input pipeline circuits 306 and an output pipeline circuit 308 of the plurality of output pipeline circuits 308. In FIG. 3, each of the arbiter circuits 310 is connected to only one of the output pipeline circuits 308. Thus, there are M number of arbiter circuits 310. If m represents the index of the output pipeline circuits 306, then for every arbiter circuit 310, the arbiter circuit 310(m) is coupled to the output pipeline circuit 308(m). In FIG. 3, the output pipeline circuit 308(m) only receives data traffic from the arbiter circuit 310(m). However, in other aspects, one or more of the arbiter circuits 310 are coupled to more than one of the output pipeline circuits 308.

If n represents the index of the input pipeline circuits 306 and m represents the index of the arbiter circuits 310 and the output pipeline circuits 308, then each arbiter circuit 310 is coupled to every input pipeline circuit 306, except the input pipeline circuit 306 where n=m. For example, the arbiter circuit 310(0) is coupled to input pipeline circuits 306(1)-306(N−1) but is not coupled to the input pipeline circuit 306(0). The reason that each arbiter circuit 310 is not coupled to the input pipeline circuit 306 where m=n has to do with a connection scheme between nodes where an input to output path does not loop back to the same core 304. This will become more apparent in the explanation of FIG. 4 below. It should be noted that in other aspects, the arbiter circuit 310 is also coupled to every input pipeline circuit 306, including the input pipeline circuit 306 where n=m. Any other coupling scheme between the arbiter circuits 310 and the input pipeline circuits 306 is within the scope of this disclosure.

In FIG. 3, each arbiter circuit 310 is configured to determine which of the input pipeline circuits 306(that are coupled to the particular arbiter circuit 310) passes data to the output pipeline circuit 308(that is coupled to the particular arbiter circuit). In this manner, each arbiter circuit 310 links one of the input pipeline circuits 306 to the output pipeline circuit 308 to which the arbiter circuit 310 is coupled. This creates a data traffic path between the selected input pipeline circuit 306 and the output pipeline circuit 308 to which the arbiter circuit 310 is coupled. For example, the arbiter circuit 310(0) can link the input pipeline circuit 306(1) to the output pipeline circuit 308(0) thereby creating a data traffic path between the input pipeline circuit 306(1) to the output pipeline circuit 308(0).

The node 302 is stalled when any of the data traffic paths created by the arbiter circuits 310 is stalled. Thus, although other data traffic paths created by the arbiter circuits 310 in the node 302 may be open to data traffic, if one of the data traffic paths is stalled, the node 302 is considered to be stalled. If there is cyclic dependency between a group of nodes (See FIG. 2), and the data traffic path that is stalled in the node 302 is connected to a downstream data path in another node, the downstream path will also stall. Since there is a cyclic dependency between the nodes, the stalling of data paths will continue to the beginning of the closed loop and a catastrophic deadlock will occur.

The node 302 includes a stall detection circuit 312. The stall detection circuit 312 is an example of the stall detection circuit 105 in FIG. 1. The stall detection circuit 312 is configured to detect a deadlock in a cyclical dependency between a set of the plurality of nodes that includes the node 302. The stall detection circuit 312 includes a plurality of stall inputs (referred to specifically as stall inputs 314(0)-314(N−1) and generically as stall inputs 314). Each of the stall inputs 314 corresponds to one of the input pipeline circuits 306. In this aspect, if n represents the index of the input pipeline circuits 306, each stall input 314(n) corresponds to the input pipeline circuit 306(n). The stall detection circuit 312 includes a plurality of stall outputs (referred to specifically as stall inputs 316(0)-316(M−1) and generically as stall outputs 316). Each of the stall outputs 316 corresponds to one of the output pipeline circuits 308. In this aspect, if m represents the index of the output pipeline circuits 308, each stall output 316(*m*) corresponds to the output pipeline circuit 308(*m*).

Each of the stall inputs 314 is connected to an upstream stall output. Each of the stall inputs 314 indicates whether the upstream stall output indicates that the upstream node is stalled. In other words, since each of the stall inputs 314 corresponds to a particular one of the input pipeline circuits 306, each of the stall inputs 314 is indicating whether the corresponding input pipeline circuit 306 is coupled to a data traffic path in the upstream node that is stalled. For example, the stall input 314(0) indicates whether the input pipeline circuit 306 is coupled to an upstream data traffic path in the upstream node that is stalled.

Each of the stall outputs 316 is coupled to a downstream stall input of a downstream node. Each of the stall outputs 316 indicates whether the node is stalled. In other words, since each of the stall outputs 316 corresponds to a particular one of the output pipeline circuits 308, each of the stall outputs 314 is indicating whether the corresponding output pipeline circuit 308 is part of a data traffic path in the node 302 that is stalled. For example, the stall output 314(0) indicates whether the output pipeline circuit 308(0) is part of a data traffic path in the node 302 that is stalled. This thereby will indicate to the downstream stall input corresponding to the input pipeline circuit of the downstream node whether the input pipeline circuit is coupled to a data traffic path in the node 302 that is stalled.

Stall inputs 314 and stall outputs 316 are linked to one another by one of the arbiter circuits 310 when the input pipeline circuit 306 that corresponds to the stall input 314 is linked by one of the arbiter circuits 310 to the output pipeline circuit 308 that corresponds to the stall output 308. The stall detection circuit 312 is configured to detect a deadlock in a cyclical dependency between a set of the plurality of nodes that includes the node 302, in response to any one of the stall inputs 314 indicating that the upstream stall output indicates that the upstream node is stalled and any one of the stall outputs 316 indicating that the node 302 is stalled, wherein the stall input 316 that indicates that the upstream stall output indicates that the upstream node is stalled is linked to the stall output 316 that indicates that the node 302 is stalled. Thus, this indicates that a data traffic path in the upstream node is stalled and a data traffic path in the node is stalled and is indicating to the downstream node that its data path is stalled. Assuming that sufficient time has been given for the stall detection circuits (e.g., like the stall detection circuit 312) throughout the mesh network to settle, this can only occur when there is a deadlock in a cyclical dependency between a set of the plurality of nodes that includes the node 302.

In order for the one of the stall outputs 316 to indicate that the node 302 is stalled, one of the plurality of input pipeline circuits 306 is stalled, wherein the one of the plurality of input pipeline circuits 306 that is stalled corresponds with the stall input that indicates the upstream node is stalled, one of the plurality of output pipeline circuits 308 is stalled, and one of the arbiter circuits 310 links the one of the plurality of input pipeline circuits 306 that is stalled to the one of the output pipeline circuits 308 that is stalled. For example, the stall input 314(0) corresponds to the input pipeline circuit 306(0). For the purposes of the example, it is assumed that the stall input 314(0) indicates that the upstream node is stalled. The stall detection circuit 312 also detects that the input pipeline circuit 306(0) is stalled. Presume the arbiter circuit 310(1) has linked the input pipeline circuit 306(0) to the output pipeline circuit 308(1) and also detects that the output pipeline circuit 308(1) is stalled. In this example, the stall output 316(1) corresponds to the output pipeline circuit 308(1). As such, since 1) the stall input 314(0) indicates that the upstream node is stalled, 2) the input pipeline circuit 306(0) that corresponds to the stall input 314(0) is stalled, 3) the input pipeline circuit 306(0) is linked to the output pipeline circuit 308(1) by one of the arbiter circuits 310(1), and 4) the output pipeline circuit 308(1) is stalled, the stall detection circuit 312 is configured to provide the stall output 316(1) corresponding to the stalled output pipeline circuit 308(1) as indicating that the node 302 is stalled. This is because the data traffic path between the input pipeline circuit 306(0) and the output pipeline circuit 308(1) is stalled and is connected to an upstream data stream path that is also stalled.

Other data traffic paths (e.g., input pipeline circuit 306(1) to output pipeline circuit 308(2) if linked to one another) may not be stalled. Thus, the stall outputs 308 corresponding to the output pipeline circuits 308 of unstalled data traffic paths would not indicate that the node 302 is stalled. Furthermore, if the data traffic path of the input pipeline circuit 306(0) and the output pipeline circuit 308(1) were stalled, but the stall input 314(0) did not indicate that the upstream node was stalled, then the stall output 316(0) would not indicate to the downstream node that the node 302 is stalled. Note also more than one of the stall outputs 308(0) can indicate that node 302 is stalled if more than one data traffic path is stalled and the stall inputs 314 that correspond to the input pipeline circuit 306 of the stalled data traffic paths also indicate that the upstream node is stalled. Thus, the stall detection circuit 312 is configured to detect a deadlock in the cyclical dependency between the set of the plurality of nodes that includes the node 302, in response to any one of the stall outputs 316 indicating that the node is stalled and any one of the arbiter circuits 310 having linked any one of the stall inputs 314 that indicates that the corresponding upstream stall output is stalled to at least one of the stall outputs 316 that indicates that the node 302 is stalled.

In this aspect, the stall detection circuit 312 is configured to receive a group of input pipeline inputs 320 that indicate whether any of the input pipeline circuits 306 is stalled. In order for one of the input pipeline circuits 306 to be stalled, all of the registers of the input pipeline circuit 306 must be full and incapable of receiving further data unless data within the registers can be externally transmitted. In response to one of the input pipeline circuits 306 being stalled, one of the input pipeline inputs 320 corresponding to the stalled input pipeline circuit 306 indicates that stalled input pipeline circuit 306 is stalled. In this manner, the stall detection circuit 312 is configured to detect whether any of the input pipeline circuits 306 is stalled.

In this aspect, the stall detection circuit 312 is configured to receive a group of output pipeline inputs 322 that indicate whether any of the output pipeline circuits 308 is stalled. In order for one of the output pipeline circuits 308 to be stalled, all of the registers of the output pipeline circuit 308 must be full and incapable of receiving further data unless data within the registers can be externally transmitted. In response to one of the output pipeline circuits 308 being stalled, one of the output pipeline inputs 322 corresponding to the stalled output pipeline circuit 308 indicates that stalled output pipeline circuit 308 is stalled. In this manner, the stall detection circuit 312 is configured to detect whether any of the output pipeline circuits 308 is stalled.

The stall detection circuit 312 includes a deadlock initiation input 324 that is coupled to a controller (not shown in FIG. 3) in order to initiate a deadlock detection test. The function of the deadlock initiation input 324 is explained further below. The stall detection circuit 312 also includes a deadlock output 326. As explained in further detail below, the stall detection circuit 312 is configured to perform an OR operation on all of the stall outputs 316 so that the deadlock output 326 indicates whether any of the stall outputs 316 indicate that the node 302 is stalled.

Figure 4:
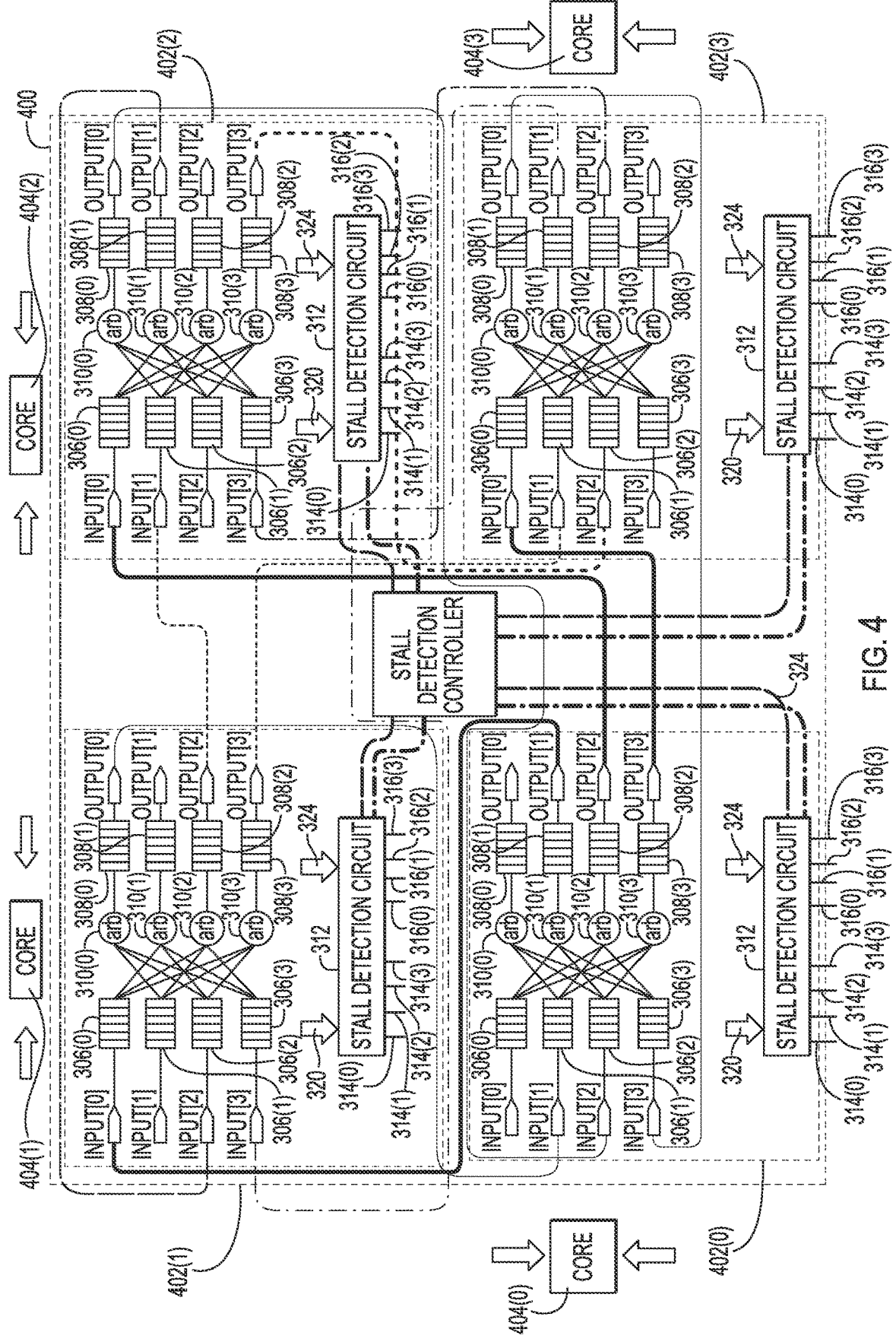
FIG. 4 illustrates a system component with set of nodes, wherein each node has input and output pipeline circuits a stall detection circuit configured to detect whether the node is involved in a cyclical deadlock, in accordance with some aspects.

FIG. 4 illustrates a system component 400 with set of nodes (referred to specifically as nodes 402(1)-402(4) and generally as nodes 402.

Each of the nodes 402 may be any of the nodes 102 shown in FIG. 1. In some aspects, the node 402(0) corresponds to the node 102(0) in FIG. 2. In some aspects, the node 402(1) corresponds to the node 102(1) in FIG. 2. In some aspects, the node 402(2) corresponds to the node 102(2) in FIG. 2. In some aspects, the node 402(3) corresponds to the node 102(3) in FIG. 2.

Each of the nodes 402 is provided in the same manner as the node 302 in FIG. 3, wherein M=4 and N=4. In other aspects, M may be equal to any other integer number and the node N may be equal to any other number. In some embodiments, the value of M and N depends on the type of chip. Inside some SoCs M and N could be in the range or 2 to 10 but in other embodiments M and N could be higher. The value of M and N is application dependent. For example, the SoC in some components used in datacenter commonly have 64-128 cores plus other attached devices (e.g., PCIe and memory.

As in the aspect of the node 302 shown in FIG. 3, each of the nodes 402 is operably associated with a different core (referred to specifically as cores 404(0) to 404(3) and generically as core(s) 404). Each of the cores 404 is configured to receive input data from the input pipeline circuits 306 of the nodes 402 operably associated with the core 404. Each of the cores 404 is configured to transmit output data to the output pipeline circuits 308 of the nodes 402 operably associated with the core 404. In this aspect, output data in the output pipeline circuits 308 of one of the cores 404 may be routed as input data to one of the input pipeline circuits 306 of another core 404 through the nodes 402.

More specifically, let i represent an index for one of the nodes 402, where the domain of i is [0–N–1], which in this example is [0-4]. For example, if i is equal to 1, this indicates the node 402(1). Furthermore, let o represent the index of another one of the nodes 402, where the domain of 0 is [0–N–1], which in this example is [0-4] and where o does not equal i. Thus, in the example above, when i=1 then o cannot equal 1. Consequently, the node 402(o) can represent any of the nodes 402 other than the node 402(i). This is simply stating that node 402(i) and node 402(o) are different nodes.

The connection scheme between the input terminals [Input[0], Input[1], Input[2], Input[3] of one node 402(i) and output terminals [Output [0], Output [1], Output [2], Output [3] is described by a simple rule. The rule is as follows: the input terminal Input[o] of node 402(i) is coupled to the output terminal Output[i] of node 402(o). This means that the input pipeline circuit 306(0) of node 402(i) is receiving as input data the output data of the output pipeline circuit 308(i) of node 402(o).

For example, the input terminal Input[1] of node 402(0) is coupled to the output terminal Output [0]. This means that the input pipeline circuit 306(1) of the node 402(0) is receiving as input data the output data of output pipeline circuit 308(0) of the node 402(1). Note that for all the nodes 402, the input terminal Input[i] and the output terminal Output[i] of node 402[i] are not connected. For example, the input node 402(0), the input terminal Input[0] and the output terminal Output [0] are left unconnected. This is because, given the rule of the connection scheme, the input terminal Input[i] and the output terminal Output[i] of node 402[i] would imply a data loop back onto the same node 402(i). In this example, a data loop back onto the same node 402 is not permitted. However, in alternative aspects, a data loop back onto the same node may be permitted. Furthermore, in alternative aspects, the input terminal Input[i], the input pipeline circuit 306(i), the arbiter circuit 310(i), the output pipeline circuit 308(i) and the output terminal Output[i] of node 402[i] may simply not be provided. It should be noted that these are just exemplary connection schemes for the nodes. Any suitable connection scheme for transmitting data traffic between the nodes 402 is within the scope of this disclosure.

As shown in FIG. 4, the nodes 402 form a mesh network 406 or are part of a mesh network 406. The data traffic can be received and transmitted between any of the nodes 402. The arbiter circuits 310 in each of the nodes 402 determines how data traffic is transmitted between the nodes in the mesh network 406.

The mesh network 406 also includes a stall detection controller 408. The stall detection controller 408 is operably associated with each of the stall detection circuits 312 in each of the nodes 402. Given the explanation of the node 302 in FIG. 3, in order for any of the stall outputs of the stall detection circuits 312 to indicate that the node 402 is stalled, not only do a linked (by one of the arbiter circuits 310) input pipeline circuit 306 and output pipeline circuit 308 within the node 402 both have to be stalled, but the stall input 314 corresponding to the stalled input pipeline circuit 306 also has to indicate that the upstream node 402 is stalled. At startup of the circuit however, given a cyclical dependency between the nodes 402, even if data traffic paths (linked input pipeline circuits 306 and output pipeline circuits 308) in all of the nodes 402 are connected and stalled, none of the stall inputs 314 indicate that the previous node 402 is stalled. Therefore, none of the stall outputs 316 of the stall detection circuits 312 of all of the nodes 402 is capable of indicating that any of the nodes 402 are stalled.

For example, consider the following cyclical dependency. The input pipeline circuit 306(0) is linked to the output pipeline circuit 308(2) by the arbiter circuit 310(2) in the node 402(1) and are both stalled. However, the stall output 316(2) cannot indicate that the node 402(1) is stalled unless the stall input 306(0) indicates that the node 402(0) is stalled.

The input pipeline circuit 306(1) is linked to the output pipeline circuit 308(3) by the arbiter circuit 310(3) in the node 402(1) and are both stalled. However, the stall output 316(3) cannot indicate that the node 402(2) is stalled unless the stall input 306(1) indicates that the node 402(1) is stalled.

The input pipeline circuit 306(2) is linked to the output pipeline circuit 308(0) by the arbiter circuit 310(0) in the node 402(3) and are both stalled. However, the stall output 316(0) cannot indicate that the node 402(3) is stalled unless the stall input 306(2) indicates that the node 402(2) is stalled.

The input pipeline circuit 306(3) is linked to the output pipeline circuit 308(1) by the arbiter circuit 310(1) in the node 402(0) and are both stalled. However, the stall output 316(1) cannot indicate that the node 402(0) is stalled unless the stall input 306(3) indicates that the node 402(3) is stalled.

Since none of the stall inputs 314 in any of the nodes 402 initially indicates a stall, then node of the stall outputs 316 can indicate a stall. Thus, to initialize the operation deadlock detection test, the stall detection controller 408 asserts the deadlock initiation input 324 for each of the stall detection circuits 312 in each of the nodes 402. In response to the deadlock initiation input 324 being asserted, the dependency of the stall outputs 316 to the stall inputs 312 and the stalling of the input pipeline circuits 306 is broken. In other words, the stall outputs 316 of each of the nodes 402 are allowed to indicate that the node 402 is stalled simply in response to just the output pipeline circuit 308 corresponding to the stall output 316 being stalled.

With regard to the example given above, in response to the deadlock initiation input 324 of the node 402(1) being asserted, the stall output 316(2) of the node 402(1) indicates that the node 402(1) is stalled because the output pipeline circuit 308(2) is stalled. In response, the stall input 314(1) of the stall detection circuit 312 of the node 402(2) indicates that the node 402(1) is stalled.

In response to the deadlock initiation input 324 of the node 402(2) being asserted, the stall output 316(3) of the node 402(2) indicates that the node 402(2) is stalled because the output pipeline circuit 308(3) is stalled. In response, the stall input 314(2) of the stall detection circuit 312 of the node 402(3) indicates that the node 402(2) is stalled.

In response to the deadlock initiation input 324 of the node 402(3) being asserted, the stall output 316(0) of the node 402(3) indicates that the node 402(3) is stalled because the output pipeline circuit 308(0) is stalled. In response, the stall input 314(3) of the stall detection circuit 312 of the node 402(0) indicates that the node 402(3) is stalled.

In response to the deadlock initiation input 324 of the node 402(0) being asserted, the stall output 316(1) of the node 402(0) indicates that the node 402(0) is stalled because the output pipeline circuit 308(1) is stalled. In response, the stall input 314(0) of the stall detection circuit 312 of the node 402(1) indicates that the node 402(0) is stalled.

The stall detection controller 408 is configured to assert the deadlock initiation input 324 of the stall detection circuits 312 of each of the nodes 402 for a first time period. The first time period should be sufficient to allow the stall inputs 314 and stall outputs 316 of each of the stall detection circuits 312 of each of the nodes 402 to settle. The first time period thus depends on the maximum propagation delay between the nodes 402 when the deadlock initiation input 324 of each of the nodes is asserted.

After a first time period, the stall detection circuit 408 is configured to deassert the deadlock initiation input 324 of the stall detection circuits 312 of each of the nodes 402. In response to the deadlock initiation input 324 of the stall detection circuits 312 of each of the nodes 402 being deasserted, the stall outputs 316 of the stall detection circuits 312 of each of the nodes 402 are again dependent on the stall inputs 314 and the stalling of linked input pipeline circuits.

Again, the input pipeline circuit 306(0) is linked to the output pipeline circuit 308(2) by the arbiter circuit 310(2) in the node 402(1) and are both stalled. However, in response to deadlock initiation input 324 in the node 402(1) being deasserted after the first time period, the stall output 316(2) indicates that the node 402(1) is stalled because the stall input 306(0) indicates that the node 402(0) is stalled and the input pipeline circuit 306(0) is linked to the output pipeline circuit 308(2) which are both stalled.

Again, the input pipeline circuit 306(1) is linked to the output pipeline circuit 308(3) by the arbiter circuit 310(3) in the node 402(1) and are both stalled. However, in response to deadlock initiation input 324 in the node 402(1) being deasserted after the first time period, the stall output 316(3) indicates that the node 402(2) is stalled because the stall input 306(1) indicates that the node 402(1) is stalled and the input pipeline circuit 306(1) is linked to the output pipeline circuit 308(3) which are both stalled.

Again, the input pipeline circuit 306(2) is linked to the output pipeline circuit 308(0) by the arbiter circuit 310(0) in the node 402(3) and are both stalled. However, in response to deadlock initiation input 324 in the node 402(1) being deasserted after the first time period, the stall output 316(0) indicates that the node 402(3) is stalled because the stall input 306(2) indicates that the node 402(2) is stalled and the input pipeline circuit 306(2) is linked to the output pipeline circuit 308(0) which are both stalled.

Again, the input pipeline circuit 306(3) is linked to the output pipeline circuit 308(1) by the arbiter circuit 310(1) in the node 402(0) and are both stalled. However, in response to deadlock initiation input 324 in the node 402(1) being deasserted after the first time period, the stall output 316(1) indicates that the node 402(0) is stalled because the stall input 306(3) indicates that the node 402(3) is stalled and the input pipeline circuit 306(3) is linked to the output pipeline circuit 308(1) by the arbiter circuit 310(1) in the node 402(0) which are both stalled.

The stall detection controller 408 is configured to deassert the deadlock initiation input 324 of the stall detection circuits 312 of each of the nodes 402 for a second time period. The second time period should be sufficient to allow the stall inputs 314 and stall outputs 316 of each of the stall detection circuits 312 of each of the nodes 402 to settle. The second time period thus depends on the maximum propagation delay between the nodes 402 when the deadlock initiation input 324 of each of the nodes is deasserted.

After the second time period, the stall detection controller 408 is configured to sample the deadlock output 326 of each of the stall detection circuits 312 of each of the nodes 402. Since at least one of the stall outputs 316 in each of the nodes 402 indicates that the node 402 is stalled, the deadlock output 326 of each of the stall detection circuits 312 of each of the nodes 402 is asserted. The stall detection controller 408 is coupled to the deadlock output 326 of each of the stall detection circuits 312 of each of the nodes 402. The stall detection controller 408 is configured to detect a deadlock because at least one of the deadlock outputs 326 is asserted. In response, the stall detection controller 408 initiates a reset operation. In the alternative, in response to none the deadlock outputs 326 from each of the stall detection circuits 312 being asserted and thus all of the deadlock outputs 326 from each of the stall detection circuits 312, the stall detection controller 408 does not initiate a reset operation.

Figure 5:
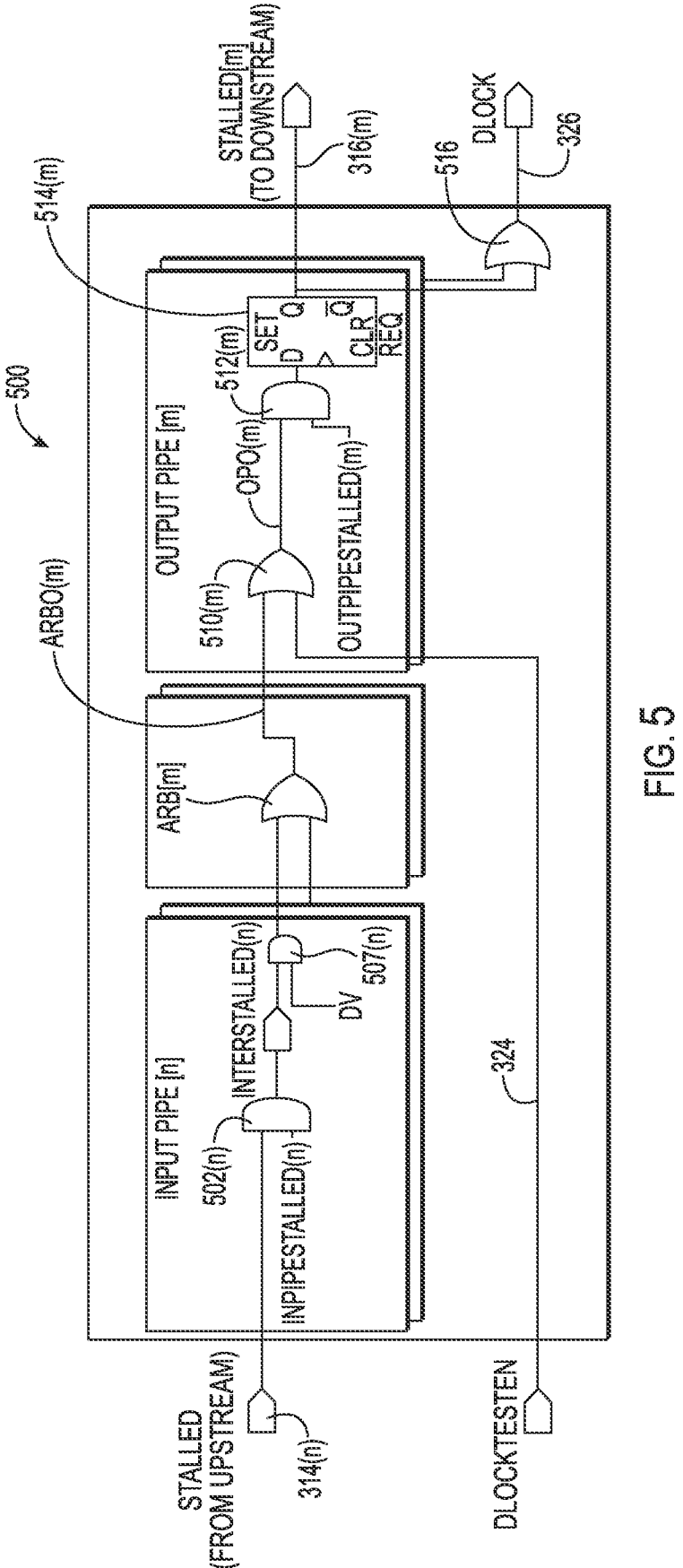
FIG. 5 is a stall detection circuit having an input pipe and an output pipe for generating a stall output based on there is a deadlock in the cyclical dependency between a group of nodes, in accordance with some aspects.

FIG. 5 is a stall detection circuit 500 in accordance with some aspects.

The stall detection circuit 312 in FIG. 3 is provided in the same manner as stall detection circuit 500 in FIG. 5, in accordance with some aspects. Furthermore, the stall detection circuits 312 of each of the nodes 402 in FIG. 4 are each provided in the same manner as stall detection circuit 500 in FIG. 5 in accordance with some aspects. It should be noted that the stall detection circuit 500 is simply exemplary and the stall detection circuits 312 in FIG. 3 and FIG. 4 may be provided in other configurations, in accordance with some aspects.

In FIG. 5, the stall detection circuit 500 includes N number (where N is defined above) of input pipes, M number of arbiter OR gates, and M number (where M number is defined above) of output pipes. There are also N number of stall inputs 314 and M number of stall outputs 316. Only input pipe Input Pipe [n] is shown (where the index n is defined above). Only the arbiter OR gate Arb [m] is shown. It should be noted that each of the arbiter OR gates is provided in the same manner as the arbiter OR gate Arb [m]. Furthermore, only the output pipe Output Pipe [m] is shown (where m is an index defined above). It should be noted that each of the input pipes are provided in the same manner as Input Pipe [n]. Furthermore, each of the output pipes is provided in the same manner as Output Pipe [m]. Additionally Each of the stall inputs 314 correspond to a different one of the input pipeline circuits 306 (See FIG. 3). Thus, the stall input 314(n) corresponds to the input pipeline circuit 306(n). Each of the input pipes correspond to a different one of the input pipeline circuits 306 (See FIG. 3). Thus, the input pipe Input Pipe [n} corresponds to the input pipeline circuit 306(n). In some aspects, each of the arbiter OR gates are provided by a corresponding arbiter circuit 310 (See FIG. 3). Thus, in some aspects, the arbiter OR gate Arb [m] is provided by the corresponding arbiter circuit 310(m). Each arbiter OR gate thus corresponds to a different one of the output pipeline circuits 308 (See FIG. 3). Accordingly, the arbiter OR gate Arb [m] thus corresponds to the output pipeline circuits 308(m). Each of the output pipes corresponds to a different one of the output pipeline circuits 308. Thus, the output pipe Output Pipe [m] corresponds to the output pipeline circuits 308(m). Each of the stall outputs 316 corresponds to a different one of the output pipeline circuits 308. Thus, the stall output 316(m) corresponds to the output pipeline circuits 308(m).

The input pipe Input Pipe (n) includes an input AND gate 502(n). The input AND gate 502(n) include an AND input coupled to the stall input 314(n). The input AND gate 502(n) include an AND input coupled to an input pipeline input InPipeStalled(n). The input pipeline input InPipeStalled(n) indicates whether the corresponding input pipeline circuit 306(n) (See FIG. 3) is stalled. The output of the input and gate 502(m) is an intermediary stall input InterStalled(n). The input AND gate 502(n) assert the intermediary stall input InterStalled(n) in response to both the stall input 314(n) being asserted (thereby indicating that the upstream node is stalled) and the input pipeline input InterStalled(n) is asserted (thereby indicating that the corresponding input pipeline circuit 306(n) is stalled). Otherwise, the input AND gate 502(n) deasserts the intermediary stall input InterStalled(n) in response to either the stall input 314(n) being deasserted (thereby indicating that the upstream node is not stalled) or the input pipeline input InPipeStalled(n) (thereby indicating that the corresponding input pipeline circuit 306 (n) is not stalled).

An arbiter gatekeeper AND gate 507 (n) has an AND input that is coupled to the InterStalled(n) and another AND input that is coupled to a data valid input DV. The arbiter gatekeeper AND gate 507 (n) corresponds to a particular one of the input pipeline circuit 306(n). As mentioned above, each of the arbiters 310(m) is associated with a particular one of the output pipeline circuits 308(m). If the input pipeline circuit 306(n) has not selected to pass data to the arbiter 310(m) associated with the output pipeline circuit 308(m), the data valid input DV is not asserted. As such, the AND output of the arbiter gatekeeper AND gate 507 (n) does not pass the InterStalled(n) to the AND output of the arbiter gatekeeper AND gate 507 (n). However, if the input pipeline circuit 306(n) has selected to pass data to the arbiter 310(m) associated with the output pipeline circuit 308(m), the data valid input DV is asserted. As such, the AND output of the arbiter gatekeeper AND gate 507 (n) is set to pass the InterStalled(n). In this manner, the InterStalled(n) is passed to output pipes Output Pipes [m] that correspond to output pipeline circuits 308(m) that are selected for data transmission.

The arbiter OR gate Arb(m) has an OR input that is connected to the AND output of each of the arbiter gatekeeper AND gates 507 (n). However, one or more of the data valid inputs DV may be asserted while the remainder of the data valid inputs DV are deasserted. The arbiter OR gate Arb(m) performs an OR operation on all of the AND outputs from all of the arbiter gatekeeper AND gates 507 corresponding to each of the input pipes circuits 306 and generates an arbiter OR output ArbO[m]. Thus, the arbiter OR output ArbO[m] is set in accordance to all of the InterStalled (n) that corresponds to the data valid inputs DV that are asserted. In this manner, arbiter OR output ArbO[m] is set in accordance with the InterStalled(n) that corresponds to the input pipeline circuit 306(n) that provide data transmission.

The output pipeline Output Pipe(m) includes an output pipe OR gate 510(m), an output AND gate 512(m), and a flip flop 514(m). The output pipe OR gate 510(m) has an output pipe OR input coupled to the arbiter OR output ArbO(m). The output pipe OR gate 510(m) has another output pipe OR input that is the deadlock initiation input 324. The output pipe OR gate 510(m) has an output pipe OR output OPO. Accordingly, in response to the deadlock initiation input 324 being deasserted, the output pipe OR output OPO(m) simply follows the arbiter OR output ArbO. However, in response to the deadlock initiation input 324 being asserted, the connection of the output pipe Output Pipe [m] is broken since the output pipe OR output OPO(m) is asserted.

The output AND gate 512(m) include an AND input coupled to the stall input 314(n). The output AND gate 512(m) include an AND input coupled to output pipe OR output OPO(m). The output AND gate 512(m) include another AND input coupled to output pipeline input OutPipeStalled(m). The output pipeline input OutPipeStalled (m) indicates whether the corresponding output pipeline circuit 308(m) is stalled. The output AND gate 512(m) have an output, which is the stall output 316(m). The output AND gate 512(m) the stall output 316(m) in response to both the output pipe OR output OPO(m) being asserted (thereby indicating that the linked stall input 314(n) and the linked input pipeline circuit 306(n) both indicate stalls or that the deadlock test is being initiated) and the output pipeline input OutPipeStalled(m) is asserted (thereby indicating that the corresponding output pipeline circuit 306(m) is stalled). Otherwise, the output AND gate 512(m) deasserts the stall output 316(m) in response to either the output pipe OR output OPO(m) being deasserted (thereby indicating that the upstream node is not stalled or the linked input pipeline circuit 306(n) is not stalled) or the output pipeline input outputPipeStalled(m) (thereby indicating that the corresponding output pipeline circuit 306(m) is not stalled).

The flip flop 514 has a flip flop input D connected to receive the stall output 316(m) before driving the stall output 316(m) to the downstream node in the fabric. In some aspects, additional flop stages may be added as necessary to close timing. Utilizing the flip flop 514 is advisable to help prevent combinatorial loops from forming.

The stall outputs 316 from each of the output pipes are provided to as inputs to OR gate 516. The OR gate 516 performs an OR operation on the stall outputs 316 from each of the output pipes. The output of the OR gate 516 is the deadlock output 326. Thus, if any of the stall outputs 316 is asserted, the deadlock output 326 is asserted thereby indicating that the node 500 is stalled.

Figure 6:
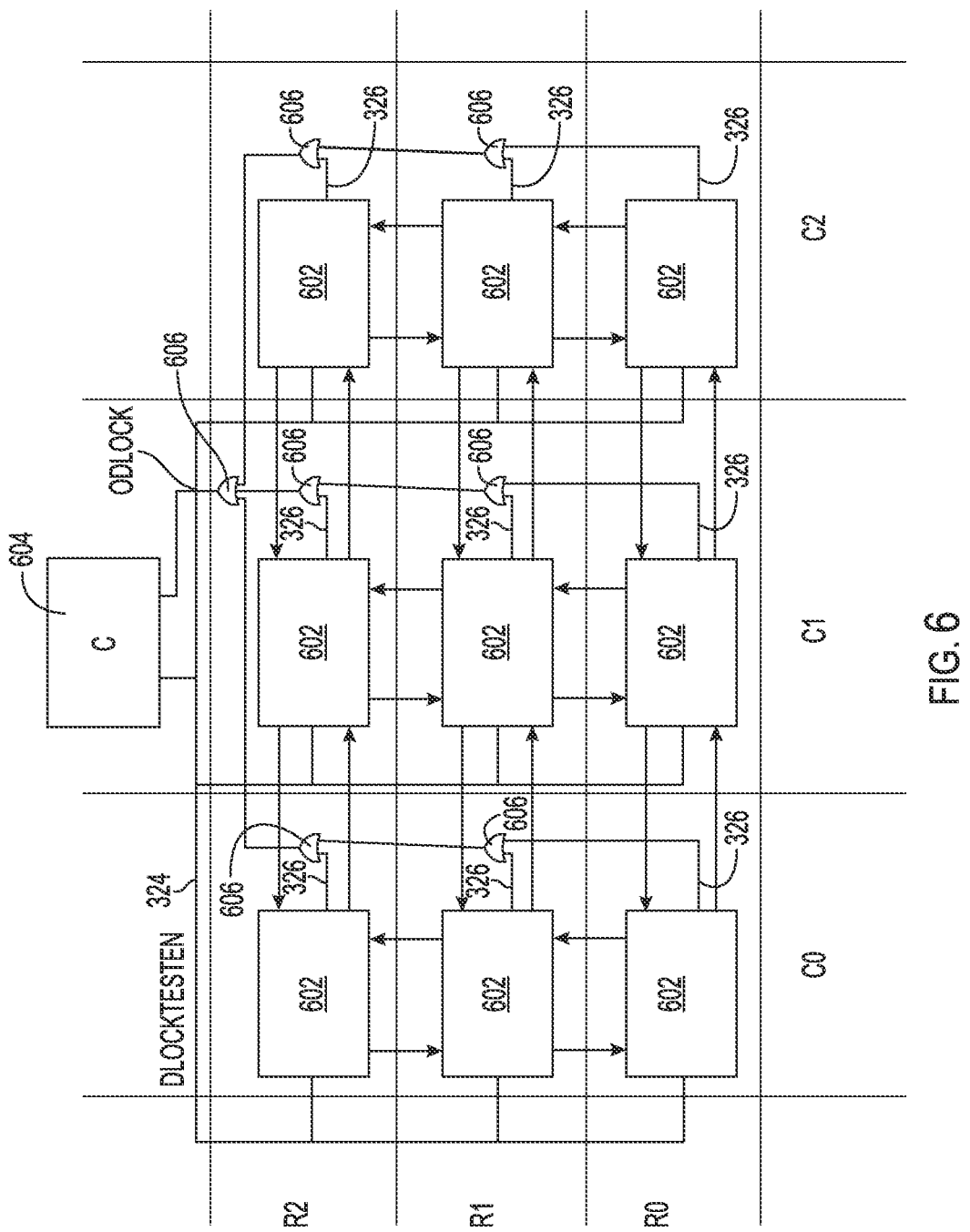
FIG. 6 is a mesh network of nodes that includes a stall detection controller and a network of OR gates based on deadlock signals received from each of the nodes that indicate whether the node is involved in a cyclical deadlock, in accordance with some aspects.

FIG. 6 is a mesh network 600 of nodes 602 in accordance with some aspects.

Each of the nodes 602 in FIG. 6 may be any one of the nodes 102 in FIG. 1. Each of the nodes 602 in FIG. 6 may be provided in the same manner as the node 302 in FIG. 3, in accordance with some aspects. Each of the nodes 602 may be connected in accordance with a connection scheme similar to the connection scheme in FIG. 4, in accordance with some aspects.

The mesh network 600 also includes the stall detection controller 604. In some aspects, the stall detection controller 604 is provided in the same manner as the stall detection controller 408 in FIG. 4.

The mesh network 600 has the nodes 602 organized in rows [R0, R1, R2] and columns [C0, C1, C2]. In this aspect, there are three rows [R0, R1, R2] and three columns [C0, C1, C2] of the nodes 602. Other aspects may have any number of rows and columns of the nodes 602.

The stall detection controller 604 is configured to assert the deadlock control output dlockTestEn connected to the deadlock initiation input 324 of each of the nodes 602. In this manner, the stall detection controller 604 is configured to initiate a deadlock detection test, as explained above. Each of the nodes 602 has the deadlock output 326, as explained above.

The mesh network 600 includes a network of OR gates 606. The network of OR gates 606 is configured to perform OR operation on the deadlock output 324 from the stall detection circuit 312 (See FIG. 3) of each of the nodes 602 and provides an overall deadlock output Odlock. The controller 604 is further coupled to the overall deadlock output Odlock. In this manner, the controller 604 is configured to sample the overall deadlock output Odlock and determine whether any of the nodes 602 are deadlocked. In response to the overall deadlock output Odlock being asserted, the controller 604 is configured to implement a reset procedure that reinitiates the nodes 602 in some known state.

With respect to the nodes 602 in initial row R0, there are no OR gates 606 in row R0. However, one OR gate 606 is provided for each of the OR gates 606 in row R1. With respect to the OR gates 606 in row R1, each of the nodes 602 in row R1 corresponds to a different one of the OR gate 606. For each OR gate 606 in row R1, a first OR input is coupled to the deadlock output 326 of the node 602 in row R1 that corresponds to the OR gate 606. A second OR input of the OR gate 606 is coupled to the deadlock output 326 of the node 602 in the same column [either C0, C1, C2] but in the previous row R0.

With respect to the OR gates 606 in row R2, each of the nodes 602 in row R2 corresponds to a different one of the OR gate 606. For each OR gate 606 in row R2, a first OR input is coupled to the deadlock output 326 of the node 602 in row R2 that corresponds to the OR gate 606. A second OR input of the OR gate 606 is coupled to the OR output of the OR gate 606 in the same column [either C0, C1, C2] but in the previous row R1.

The OR output of the OR gate 606 in row R2 are each coupled as different OR inputs to a final one of the OR gates 606 that is outside the rows and columns. The OR output of the final one of the OR gates 606 is the overall deadlock output Odlock. The stall detection controller 604 is coupled to the overall deadlock output Odlock.

In some aspects, there may be additional rows of nodes 602 and therefore OR gates. The row R3 shown in FIG. 6 is the configuration of the final row. However, if additional intermediary rows were provided between rows configured in the same manner as row R2 (row after the initial row) and configured in the same manner as row R3 (configuration of the final row), the OR inputs would be configured in the same manner as row R3 in that the OR gates 606 would receive one OR input from the OR output of the OR gate in the same column but previous row and another OR input from the node 602 that it is associated with. The OR output of the OR gate 606 in the additional intermediary row would be provided in the same manner as the OR gates 606 in row 2, in that the OR output would be an OR input of the OR gate 606 in the subsequent row. These and other configurations of the OR gates 606 and nodes 606 are within the scope of this disclosure.

FIG. 7 is a flow diagram 700 illustrating a method of detecting a deadlock in a cyclical dependency between a set of the plurality of nodes in a mesh network, wherein each of the nodes having a stall detection circuit, in accordance with some aspects.

Flow diagram 700 includes procedures 702-712. In some aspects, the mesh network that performs procedures 702-712 is the mesh network 100 shown in FIG. 1, the mesh network 406 in FIG. 4, or the mesh network 600 shown in FIG. 6. Examples of the nodes include the nodes 102 in FIG. 1, the nodes 102 in FIG. 2, the node 302 in FIG. 3, the nodes 402 in FIG. 4, and the nodes 602 in FIG. 6. Examples of the stall detection circuit are the stall detection circuit 105 in FIG. 1, the stall detections circuits 302 in FIG. 3 and FIG. 4, and the stall detection circuit 500 in FIG. 5. Flow begins at procedure 702.

At procedure 702, a deadlock initiation input of each of the stall detection circuits is asserted for a first time period. In some aspects, procedure 702 is performed by a stall detection controller. In some aspects, the stall detection controller is the stall detection controller 408 in FIG. 4 or the stall detection controller 604 in FIG. 5. In some aspects, the first time period should be sufficient to allow stall inputs and stall outputs of each of the stall detection circuits of each of the nodes to settle. In some aspects, the first time period thus depends on the maximum propagation delay between the nodes when the deadlock initiation input of each of the nodes is asserted. In some aspects, the stall inputs are the stall inputs 314 in FIG. 3, FIG. 4, and FIG. 5. In some aspects, the stall outputs are the stall outputs 316 in FIG. 3, FIG. 4, and FIG. 5.

In some aspects, the deadlock initiation input is asserted after the expiration of the timer. Thus, after a certain time period, the stall detection controller initiates a stall detection test to make sure that there is no deadlock. In other aspects, the stall detection controller is configured to monitor certain parameters related to the operation of the cores and/or the mesh network. In response to the parameters indicating inefficient operation of the cores and/or the mesh network, the stall detection circuit initiates the stall detection test by asserting the deadlock initiation input. Flow then proceeds to procedure 704.

At procedure 704, the deadlock initiation input of each of the stall detection circuits is deasserted for a second time period. In some aspects, the second time period should be sufficient to allow the stall inputs and stall outputs of each of the stall detection circuits of each of the nodes to settle. The second time period thus depends on the maximum propagation delay between the nodes when the deadlock initiation input of each of the nodes is deasserted. Flow then proceeds to procedure 706.

At procedure 706, a stall input of a stall detection circuit of the stall detection circuits is detected as indicating that an upstream stall output indicates that an upstream node is stalled. Flow then proceeds to procedure 708.

At procedure 708, a stall output of the stall detection circuit is detected as indicating that the node is stalled. Flow then proceeds to block 710.

At procedure 710, OR operations are performed on stall outputs from each of the nodes to determine whether an overall deadlock output is asserted, wherein the stall outputs include the stall output. In some aspects, the OR operations are performed by the OR gate 516 in FIG. 5 and/or the OR gates 606 in FIG. 6. Flow then proceeds to block 712.

At procedure 712, an overall deadlock output is sampled to determine whether any of the nodes are stalled. In some aspects, the overall deadlock output is the overall deadlock output Odlock in FIG. 6. In some aspects, if the deadlock is detected, the mesh network is reset. In some aspects, if the deadlock is not detected, the mesh network again is configured to continue normal operations.

FIG. 8 is a block diagram of an exemplary processor-based system 800 that includes a processor 802 configured to execute computer instructions for execution. The processor-based system also includes a memory system 804 that includes one or more memory arrays that each include multiple memory banks and include an integrated serialization circuit configured to convert parallel data streams of read data received from separately switched memory banks into a single, serialized, read data stream to be provided on the output bus in a burst read mode, and/or a de-serialization circuit configured to convert a received, serialized write data stream on an input bus for a write operation into separate, parallel write data streams to be written simultaneously to the memory banks in a burst write mode. The memory system 804 in this example includes an instruction cache 806, a data cache 808, and a system memory 810.

With continuing reference to FIG. 8, the processor-based system 800 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. The processor 802 represents one or more general-purpose processing circuits, such as a microprocessor, central processing unit, or the like. The processor 802 includes an instruction processing circuit 809 configured to execute processing logic in computer instructions for performing the operations and steps discussed herein. The processor 802 also includes the instruction cache 806 for temporary, fast access memory storage of instructions. Fetched or prefetched instructions from a memory, such as from a system memory 810 over a system bus 812, are stored in the instruction cache 806. The processor 802 also includes a data cache 808 for temporary, fast access memory storage of data from the system memory 810 over the system bus 812. In some aspects, the processor 802 has cores that communicate via a mesh network, such as the mesh network 100 shown in FIG. 1, the mesh network 406 in FIG. 4, or the mesh network 600 shown in FIG. 6

The processor 802 and the system memory 810 are coupled to the system bus 812 and can intercouple peripheral devices included in the processor-based system 800. As is well known, the processor 802 communicates with these other devices by exchanging address, control, and data information over the system bus 812. For example, the processor 802 can communicate bus transaction requests to a memory controller 814 in the system memory 810 as an example of a slave device. Although not illustrated in FIG. 8, multiple system buses 812 could be provided, wherein each system bus constitutes a different fabric. In this example, the memory controller 814 is configured to provide memory access requests to a memory array 816 in the system memory 810. The memory array 816 is comprised of an array of storage bit cells for storing data. The system memory 810 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 812. As illustrated in FIG. 8, these devices can include the system memory 810, one or more input device(s) 818, one or more output device(s) 820, a modem 822, and one or more display controllers 824, as examples. The input device(s) 818 can include any type of input device, including but not limited to input keys, switches, voice processors, etc. The output device(s) 820 can include any type of output device, including but not limited to audio, video, other visual indicators, etc. The modem 822 can be any device configured to allow the exchange of data to and from a network 826. The network 826 can be any type of network, including but not limited to a wired or wireless network, a private or public network, a local area network (LAN), a wireless local area network (WLAN), a wide area network (WAN), a BLU-ETOOTH™ network, and the Internet. The modem 822 can be configured to support any type of communications protocol desired. The processor 802 may also be configured to access the display controller(s) 824 over the system bus 812 to control information sent to one or more displays 828. The display(s) 828 can include any type of display, including but not limited to a cathode ray tube (CRT), a liquid crystal display (LCD), a plasma display, etc.

The processor-based system 800 in FIG. 8 may include a set of instructions 830 that when executed by a processor, such as processor 802, perform serialization of read data from the memory system 804 by converting parallel data streams of read data received from separately switched memory banks into a single, serialized, read data stream to be provided on the output bus in a burst read mode, and/or perform de-serialization of write data communicated to the memory system 804 to be written by converting a received, serialized write data stream on an input bus for a write operation into separate, parallel write data streams to be written simultaneously to the memory banks in a burst write mode. The instructions 830 may be stored in the system memory 810, processor 802, and/or instruction cache 806 as examples of non-transitory computer-readable medium 832. The instructions 830 may also reside, completely or at least partially, within the system memory 810 and/or within the processor 802 during their execution. The instructions 830 may further be transmitted or received over the network 826 via the modem 822, such that the network 826 includes the non-transitory computer-readable medium 832, or the input device 818 as other examples.

While the non-transitory computer-readable medium 832 is shown in an exemplary aspect to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the aspects disclosed herein. The term "computer-readable medium" shall accordingly be taken to include, but not be limited to, solid-state memories, optical medium, and magnetic medium.

The aspects disclosed herein include various steps. The steps of the aspects disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The aspects disclosed herein may be provided as a computer program product, or software, that may include a machine-readable medium (or computer-readable medium) having stored thereon instructions, which may be used to program a computer system (or other electronic devices) to perform a process according to the aspects disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the aspects described herein are not described with reference to any particular programming language. It will be appreciated that a variety of programming languages may be used to implement the teachings of the aspects as described herein.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The components systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present aspects.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed aspects incorporating the spirit and substance of the invention may occur to persons skilled in the art, the invention should be construed to include everything within the scope of the appended claims and their equivalents.

What is claimed is:

1. A mesh network, comprising:

a plurality of nodes configured to form the mesh network, each node comprising:

a plurality of input pipeline circuits;

a plurality of output storage pipeline circuits; and a plurality of arbiter circuits each configured to arbitrate data traffic by selectively linking a input pipeline circuit of the plurality of input pipeline circuits to an output pipeline circuit of the plurality of output pipeline circuits; and a stall detection circuit, comprising:

a stall input coupled to an upstream stall output of an upstream node in the plurality of nodes, the stall input corresponding to the input pipeline circuit of the plurality of input pipeline circuits; and a stall output coupled to a downstream stall input of a downstream node in the plurality of nodes, the stall output corresponding to the output pipeline circuit of the plurality of output pipeline circuits;

wherein the stall detection circuit is configured to assert the stall output when:

the input pipeline circuit of the input pipeline circuits corresponding to the stall input is stalled, the output pipeline circuit of the output pipeline circuits corresponding to the stall output is stalled, and the arbiter circuits have linked the input pipeline circuit of the input pipeline circuits to the output pipeline circuit of the output pipeline circuits;

and wherein the stall detection circuit is further configured to detect a deadlock in a cyclical dependency between a set of the plurality of nodes that includes a node of the plurality of nodes in which the stall detection circuit is provided, in response to both:

the stall input indicating that the upstream stall output indicates that the upstream node is stalled, and the stall output being asserted indicating that the node is stalled.

2. The mesh network of claim 1, wherein the stall detection circuit is configured to provide the stall output such that the stall output indicates that the node is stalled, in response to:

one of the plurality of input pipeline circuits is stalled, wherein the one of the plurality of input pipeline circuits that is stalled corresponds with the stall input;

one of the plurality of output pipeline circuits is stalled; and one of the arbiter circuits links the one of the plurality of input pipeline circuits that is stalled to the one of the output pipeline circuits that is stalled.

3. The mesh network of claim 2, wherein the stall output corresponds to the one of the output pipeline circuits that is stalled.

4. The mesh network of claim 1, wherein:

the stall input is a first stall input;

the upstream stall output is a first upstream stall output;

the stall output is a first stall output;

the downstream stall input is a first downstream stall input; and the stall detection circuit further comprises:

a plurality of stall inputs that include the first stall input, each of the stall inputs is coupled to a different one a plurality of upstream stall outputs of the upstream node, the plurality of upstream stall outputs including the first upstream stall output, each of the input pipeline circuits corresponding to a different one of the stall inputs; and a plurality of stall outputs that include the first stall output, each of the stall outputs is coupled to a different one of a plurality of downstream stall inputs of the downstream node, the plurality of downstream stall inputs including the first downstream stall input, each of the output pipeline circuits corresponding to a different one of the stall output.

5. The mesh network of claim 4, wherein the stall detection circuit is configured to detect the deadlock in the cyclical dependency between the set of the plurality of nodes that includes the node, in response to:

any one of the stall outputs indicating that the node is stalled; and any one of the arbiter circuits having linked any one of the stall inputs that indicates that the corresponding upstream stall output is stalled to at least one of the stall outputs that indicates that the node is stalled.

6. The mesh network of claim 5, wherein the stall detection circuit is configured to provide any one of the stall outputs so as to indicate that the node is stalled, in response to:

one of the plurality of input pipeline circuits being stalled, wherein the one of the plurality of input pipeline circuits that is stalled corresponds with one of the stall inputs that indicates that the upstream node is stalled;

one of the plurality of output pipeline circuits is stalled; and any one of the arbiter circuits linking the one of the plurality of input pipeline circuits that is stalled to the one of the output pipeline circuits that is stalled.

7. The mesh network of claim 6, wherein each of the stall outputs corresponds to a different one of the output pipeline circuits.

8. The mesh network of claim 1, wherein the stall detection circuit at further comprises:

an input pipeline input configured to indicate whether an input pipeline circuit of the plurality of input pipeline circuit is stalled;

an output pipeline input configured to indicate whether an output pipeline circuit of the plurality of output pipeline circuits is stalled; and wherein the stall detection circuit of each of the nodes is configured to generate the stall output such that the stall output indicates that the node is stalled in response to:

at least one of the arbiter circuits having linked the input pipeline circuit to the output pipeline circuit;

the input pipeline input indicating that the input pipeline circuit is stalled, wherein the stall input corresponds to the input pipeline circuit; and the output pipeline circuit indicating that the output pipeline circuit is stalled, wherein the stall output corresponds to the output pipeline circuit.

9. The mesh network of claim 8, wherein the stall detection circuit comprises an input AND gate and an output AND gate, wherein:

the input AND gate having a first AND input coupled to the stall input and a second AND input coupled to the input pipeline input, the input AND gate first AND output as an intermediary stall input; and the output AND gate having a third AND input operably associated with the intermediary stall input by the at least one of the arbiter circuits and a fourth stall input coupled to the output pipeline input, wherein the output AND gate has the stall output.

10. The mesh network of claim 9, wherein the stall detection circuit further comprises an output pipe OR gate, wherein:

the output pipe OR gate has a first OR input operably associated with the intermediary stall input and a second OR input coupled to a deadlock initiation input, the output pipe OR gate having an output pipe OR output; and the third AND input is coupled to the output pipe OR output.

11. The mesh network of claim 10, further comprising a controller configured to assert the deadlock initiation input so as to initiate a deadlock detection test.

12. The mesh network of claim 1, wherein:

the stall input is a first stall input;

the upstream stall output is a first upstream stall output;

the stall output is a first stall output;

the downstream stall input is a first downstream stall input;

the stall detection circuit of each of the nodes further comprises:

a plurality of stall inputs that include the first stall input, each of the stall inputs is coupled to a different one a plurality of upstream stall outputs of the upstream node, the plurality of upstream stall outputs including the first upstream stall output, each of the input pipeline circuits corresponding to a different one of the stall inputs; and a plurality of stall outputs that include the first stall output, each of the stall outputs is coupled to a different one of a plurality of downstream stall inputs of the downstream node, the plurality of downstream stall inputs including the first downstream stall input, each of the output pipeline circuits corresponding to a different one of the stall output;

a plurality of input AND gates, each of the input AND gates corresponding to a different one of the input pipeline circuits, wherein each of the input AND gates has a first AND input coupled to a different one of the stall inputs and a second AND input coupled to a different one of the input pipeline inputs, wherein each of the input AND gate has an intermediary stall input;

a plurality of output pipe OR gates, each output pipe OR gate of the output pipe OR gates corresponding to a different one of the output pipeline circuits, wherein each of the output pipe OR gates has a first OR input that is operably associated with the intermediary stall input of one of the input AND gates that corresponds to one of the input pipeline circuits that has been linked to the output pipe OR gate, a second OR input coupled to a deadlock initiation input, and an output pipe OR output; and a plurality of output AND gate, each output AND gate of the output AND gates corresponding to a different one of the output pipeline circuits, each of the output AND gates having a third AND input coupled to the output pipe OR output that has linked the one of the input pipeline circuit to the corresponding output pipeline circuit of the output AND gate and a fourth stall input coupled to the output pipeline input of the corresponding output pipeline circuit, wherein the output AND gate has a different one of stall outputs.

13. The mesh network of claim 12, wherein the stall detection circuit of each of the nodes further comprises a deadlock OR gate, the deadlock OR gate comprising a plurality of deadlock OR inputs and a deadlock OR output, each of the deadlock OR inputs being coupled to a different one of the stall outputs.

14. The mesh network of claim 13, further comprising a controller coupled to the deadlock initiation input.

15. The mesh network of claim 14, further comprising a network of OR gates configured to perform OR operation on the deadlock OR output from the stall detection circuit of each of the nodes and provide an overall deadlock output, wherein the controller is further coupled to the overall deadlock output.

16. The mesh network of claim 15, wherein the controller is configured to:

assert the deadlock initiation input for a first time period;

deassert the deadlock initiation input for a second time period; and sample the overall deadlock output to determine whether any of the nodes are stalled after the deadlock initiation input has been deasserted for the second time period.

17. The mesh network of claim 16, wherein the controller is further configured to declare that a deadlock has been detected in response to the overall deadlock output being asserted.

18. The mesh network of claim 1, further comprising a plurality of cores, each of the cores being operably associated with a different one of the nodes and wherein each of the nodes is a router for the corresponding core.

19. The mesh network of claim 18, wherein the mesh network is provided in a system on chip (SoC).

20. A method of detecting a deadlock in a cyclical dependency between a set of the plurality of nodes in a mesh network, each of the nodes having a stall detection circuit, the method comprising:

asserting a deadlock initiation input of each of the stall detection circuits for a first time period;

deasserting the deadlock initiation input of each of the stall detection circuits for a second time period;

detecting that a stall input of a stall detection circuit of the stall detection circuits indicates that an upstream stall output indicates that an upstream node is stalled;

detecting whether a stall output of the stall detection circuit indicates that the node is stalled;

performing OR operations on stall outputs from each of the nodes to determine whether an overall deadlock output is asserted, wherein the stall outputs includes the stall output; and sampling an overall deadlock output to determine whether any of the nodes are stalled.

* * * * *